US006208376B1

(12) United States Patent
Tanaka et al.

(10) Patent No.: US 6,208,376 B1
(45) Date of Patent: Mar. 27, 2001

(54) COMMUNICATION SYSTEM AND METHOD AND STORAGE MEDIUM FOR STORING PROGRAMS IN COMMUNICATION SYSTEM

(75) Inventors: Koichiro Tanaka, Tokyo; Akitomo Sasaki, Kawasaki; Hiroki Yonezawa, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/839,914

(22) Filed: Apr. 21, 1997

(30) Foreign Application Priority Data

Apr. 22, 1996 (JP) .................................................. 8-100171
Apr. 24, 1996 (JP) .................................................. 8-102491

(51) Int. Cl.⁷ .................................................. H04N 7/18
(52) U.S. Cl. .......................... 348/153; 348/143; 348/159; 348/213; 348/705; 348/564
(58) Field of Search ..................................... 348/705, 211, 348/212, 213, 143, 153, 156, 159, 8, 2, 157, 10, 15, 509, 563, 564, 565; 386/117, 118; 345/30, 960; 379/93.23; H04N 7/18

(56) References Cited

U.S. PATENT DOCUMENTS

| 4,511,886 | * | 4/1985 | Rodriguez | 340/534 |
|---|---|---|---|---|
| 5,073,926 | * | 12/1991 | Suzuki et al. | 379/53 |
| 5,142,367 | * | 8/1992 | Hong | 358/183 |
| 5,164,827 | * | 11/1992 | Paff | 358/108 |
| 5,258,839 | * | 11/1993 | Bae | 358/142 |
| 5,305,100 | * | 4/1994 | Choi | 348/159 |
| 5,491,511 | * | 2/1996 | Odle | 348/153 |
| 5,506,690 | * | 4/1996 | Kim | 358/342 |
| 5,508,737 | * | 4/1996 | Lang | 358/159 |
| 5,517,236 | * | 5/1996 | Sergeant et al. | 348/143 |
| 5,526,133 | * | 6/1996 | Paff | 358/335 |
| 5,579,060 | * | 11/1996 | Elberbaum | 348/705 |
| 5,594,524 | * | 1/1997 | Sasagaki et al. | 396/287 |
| 5,598,208 | * | 1/1997 | McClintock | 348/159 |
| 5,745,161 | | 4/1998 | Ito | 348/15 |
| 5,745,166 | * | 4/1998 | Rhodes et al. | 348/143 |
| 5,745,167 | * | 4/1998 | Kageyu et al. | 348/153 |
| 5,778,054 | * | 7/1998 | Kimura et al. | 379/93.23 |
| 5,825,432 | * | 10/1998 | Yonezawa | 348/563 |
| 5,870,139 | * | 2/1999 | Cooper et al. | 348/159 |
| 5,956,081 | * | 9/1999 | Katz et al. | 348/163 |

* cited by examiner

Primary Examiner—John K. Peng
Assistant Examiner—Jean W. Désir
(74) Attorney, Agent, or Firm—Morgan & Finnegan, LLP

(57) ABSTRACT

A communication system easy to be operated upon as to the display method of images generated by image generating units of a plurality of communication terminals and as to the control of each image generating unit. The communication system has a reception unit for receiving images generated by image generating units of a plurality of communication terminals, an output unit for outputting a multi-image of images received by the reception unit to a display unit, a designation unit for designating an arbitrary image from the images constituting the multi-image, and a processing unit for controlling the output form of an image to be output to the display unit, the image being designated by the designation unit, if a designation operation by the designation unit is a first designation operation, and for setting the communication terminal as a control object, the communication terminal generating an image designated by the designation unit, if a designation operation by the designation unit is a second designation operation.

29 Claims, 20 Drawing Sheets

COMMUNICATION SYSTEM AND METHOD AND STORAGE MEDIUM FOR STORING PROGRAMS IN COMMUNICATION SYSTEM

BACKGROUND OF THE INVENTION

1. Field of the Invention

The present invention relates to a communication system and method, and a storage medium storing programs in communication system.

2. Related Background Art

A remote monitor system using a plurality of video cameras and a synthesizer for synthesizing in an analog manner images taken with the cameras has been used in a building of a relatively small scale or the like and such as system is called a local monitor system. In contrast to such a local monitor system, a remote monitor system has been proposed in which a plurality of cameras are connected by a digital network such as LAN (local area network) and public digital line ISDN so that the more cameras at remoter sites can be controlled more flexibly.

Of remote monitor systems, some systems control the image display and system operations through graphical user interface (GUI) by using personal computers or work stations as monitor terminals. Use of GUI at a monitor terminal enables a computer device to operate the system easily. The operability of the system can be improved by displaying a camera control panel together with an image taken with the camera.

However, conventional methods of displaying images with such a system include various methods such as a glance display of images taken with a plurality of cameras. A conventional display operation and discrimination between system operations are not always good heretofore. Personal computers and work stations are directly, or via a synthesizer for image synthesis and a switcher for switching between cameras, connected to the network. The image synthesizer can select one of cameras connected thereto to display its image, or can display a plurality of images side by side at the same time. By using the switcher, any desired camera can be selected to be controlled.

However, the operability of the system which inputs images via the switcher/synthesizer is not so much satisfactory and there is still a room to be improved.

SUMMARY OF THE INVENTION

It is an object of the present invention to solve the above problems and provide a communication system and method and a storage medium storing communication system programs, capable of providing flexible operations.

It is another object of the present invention to provide a communication system and method having user interface (UI) capable of being flexibly operated upon and provide a communication system and method and a storage medium storing communication system programs, capable of switching, when necessary, between a glance display mode of displaying images supplied from a plurality of communication terminals and a fine display mode of displaying a single image taken with each camera.

According to one aspect of the present invention achieving the above objects, a communication system comprises reception means for receiving images generated by image generating units of a plurality of communication terminals, output means for outputting a multi-image of images received by the reception means to a display unit, designation means for designating an arbitrary image from the images constituting the multi-image, and processing means for controlling the output form of an image to be output to the display unit, the image being designated by the designation means, if a designation operation by the designation means is a first designation operation, and for setting the communication terminal as a control object, the communication terminal generating an image designated by the designation means, if a designation operation by the designation means is a second designation operation.

It is another object of the present invention to improve the operability of the system when images are supplied via a switcher or synthesizer.

It is another object of the present invention to provide a communication system and method and a storage medium storing communication system programs, having novel functions.

The other objects and aspects of the present invention will become more apparent from the following detailed description and appended claims when read in connection with the accompanying drawings.

DETAILED DESCRIPTION OF THE PREFERRED EMBODIMENTS

<First Embodiment>

Figure 1:
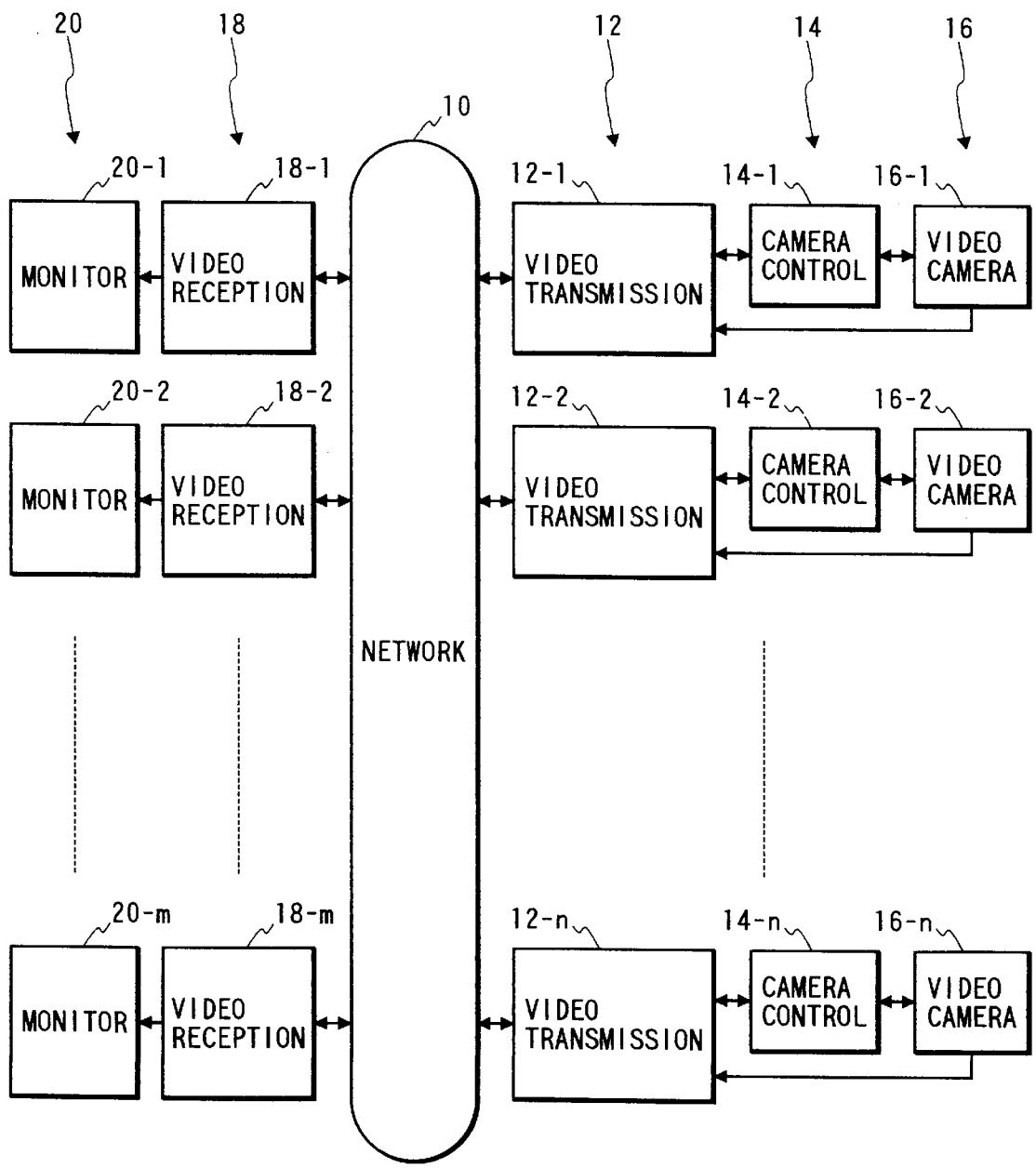
FIG. 1 is a block diagram briefly showing the overall structure of a system according to a first embodiment of the invention.

FIG. 1 is a block diagram briefly showing the structure of an overall system according to an embodiment of the invention. A digital network 10 transfers digital signals of video data and camera control information (inclusive of status information). The digital network 10 is connected to n video transmission terminals 12 (12-1 to 12-n). Each video transmission terminal 12 is connected via a camera controller 14 (14-1 to 14-n) to a video camera 16 (16-1 to 16-n). In accordance with a control signal supplied from the terminal 12, the camera controller 14 controls panning, tilting, zooming, focussing, diaphragming, and the like of the connected video camera 16. The video camera 16 is supplied with power from the camera controller 14 which in accordance with an external control signal received from a video reception terminal 18 (18-1 to 18-m), turns on and off the power.

The network 10 is also connected to m video reception terminals 18 which receive video signals transmitted from the video transmission terminals 12 via the network 10 and display them on m monitor displays (hereinafter abbreviated as monitors) 20 (20-1 to 20-m).

The video transmission terminal 12 compresses video signals output from the connected video camera 16 in a predetermined compression format such as H.261, MPEG, and Motion JPEG and transmits the compressed video signals to the video requesting video reception terminal 18 or to all the video reception terminals 18. The video reception terminal 18 received the video signal operates to display the image in a video display area of the monitor 20. The video reception terminal 18 can control, via the network 10, video transmission terminal 12, and camera controller 14, various parameters (such as photographing direction, magnification factor, focus, and diaphragm) as well as a power supply (from on to off or vice versa) of any one or ones of desired cameras 16. The details of this will be later described in detail.

A video reception terminal may be realized by providing the video transmission terminal 12 with a monitor and a video expansion device for expanding compressed video signals. Similarly, a video transmission terminal may be realized by providing the video reception terminal 18 with a camera controller, a video camera, and a video compression device. In this case, it is obvious that software for video transmission or reception is also provided.

Figure 2:
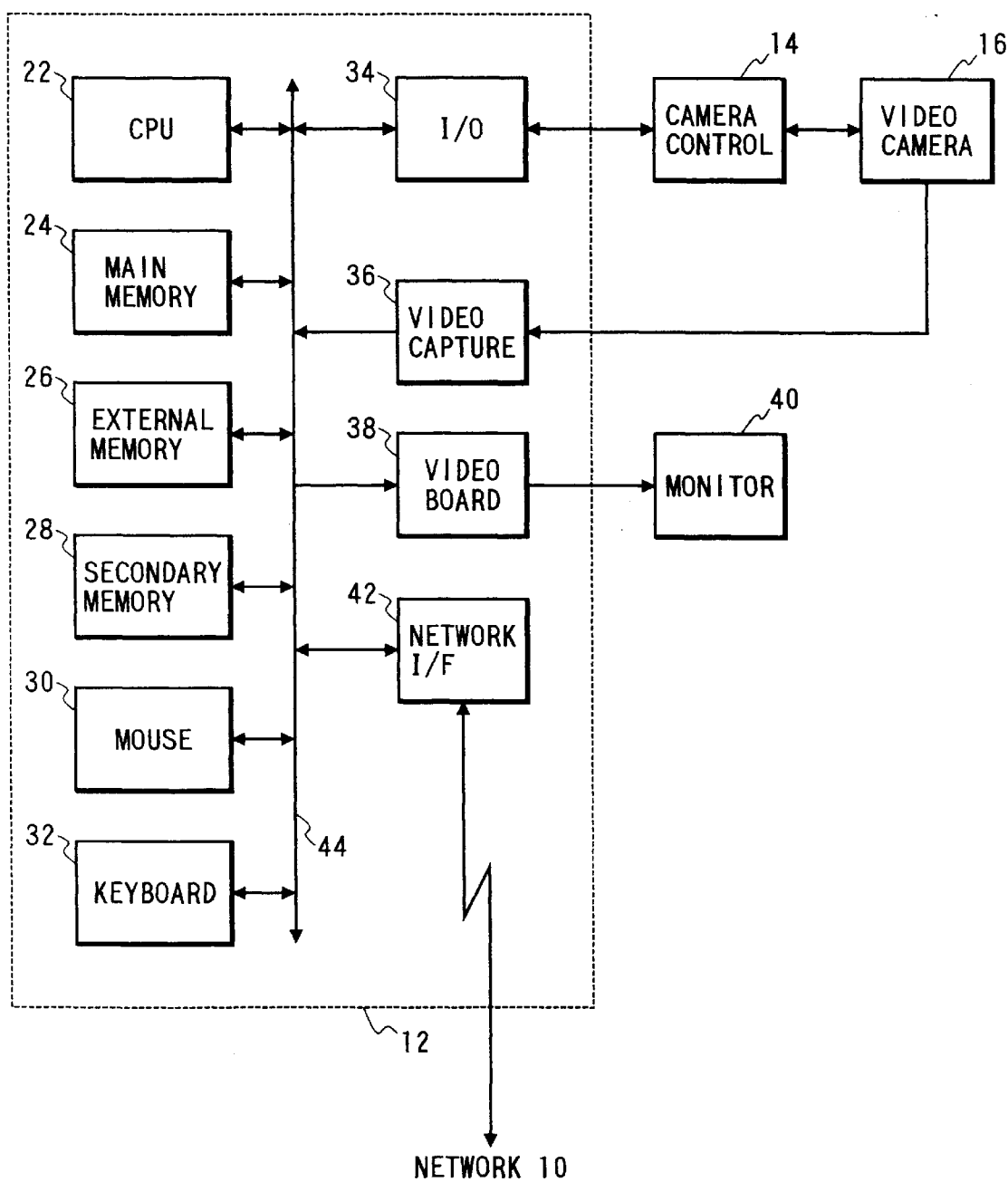
FIG. 2 is a block diagram showing the outline structure of a video transmission terminal of the first embodiment.

FIG. 2 is a block diagram showing the outline structure of the video transmission terminal 12. Reference numeral 22 represents a CPU for controlling the entirety of the terminal 12, reference numeral 24 represents a main storage, reference numeral 26 represents a removable external storage unit such as a floppy disk and a CD-ROM, reference numeral 28 represents a secondary storage unit such as a hard disk, reference numeral 30 represents a mouse as a pointing device, reference numeral 32 represents a keyboard, reference numeral 34 represents an I/O board for interface with the camera controller 14 and transfer of a camera control signal, and reference numeral 36 represents a video capture board for receiving a video signal output from the video camera 16. The video capture board 36 of this embodiment has an A/D conversion function of converting an analog video signal into a digital video signal and a function of compressing video signals. Reference numeral 38 represents a video board for displaying images on the screen of a monitor 40, reference numeral 42 represents a network interface, reference numeral 44 represents a system bus for interconnecting devices 22 to 38, and 42.

The video board 38 and monitor 40 may be omitted for video transmission only.

The terminal 12 constructed as above transmits video signals via the network to a remote video reception terminal (monitor terminal) and receives a camera control signal from a remote monitor terminal to control the camera 16.

Figure 3:
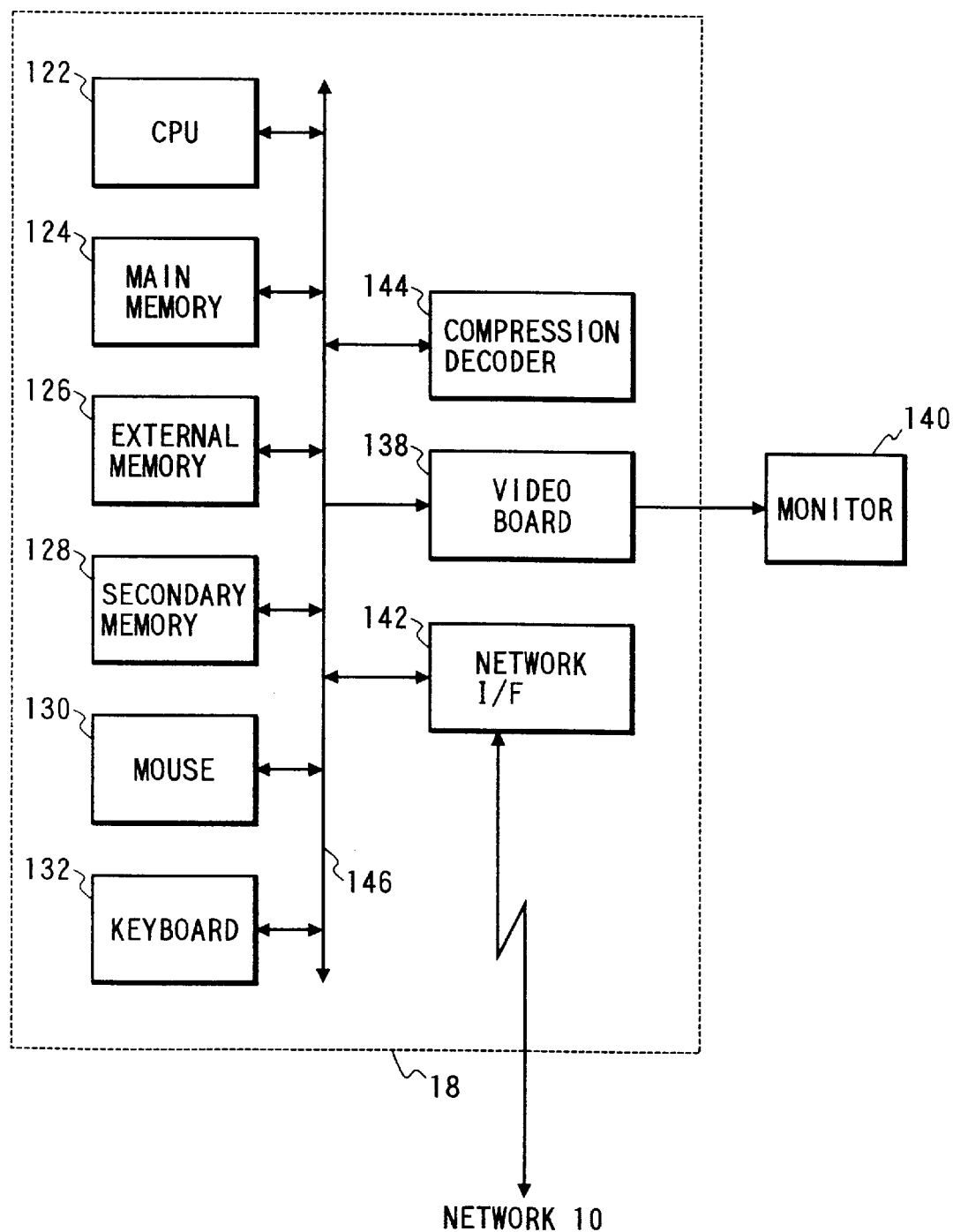
FIG. 3 is a block diagram showing the outline structure of a video reception terminal (monitor terminal) of the first embodiment.

FIG. 3 is a block diagram showing the outline structure of the video reception terminal (monitor terminal) 18. Reference numeral 122 represents a CPU for controlling the entirety of the terminal 18, reference numeral 124 represents a main storage, reference numeral 126 represents a removable external storage unit such as a floppy disk and a CD-ROM, reference numeral 128 represents a secondary storage unit such as a hard disk, reference numeral 130 represents a mouse as a pointing device, reference numeral 132 represents a keyboard, reference numeral 138 represents a video board for displaying images on the screen of a monitor 140, reference numeral 142 represents a network interface, reference numeral 144 represents a compression decoder for expanding compressed video signals, and reference numeral 146 represents a system bus for interconnecting devices 122 to 132, 138, 142, and 144.

The video reception terminal 18 has the same structure as the video transmission terminal 12 shown in FIG. 2 excepting that it has no function of controlling the camera and receiving camera images, that it has the decoder 144 for expanding compressed video signals, and that it has different system software from that of the video transmission terminal 12. Some or all of the video reception terminals 18 can transmit a camera control signal to any one or ones of the video transmission terminals 12 or to the terminals 12 permitted to control their cameras. The video transmission terminal 12 received the camera control signal controls its camera 16 in accordance with the contents of the camera control signal, and sends back the current status of the camera 16. In accordance with the received status signal, the monitor terminal displays the current status of the camera on the monitor. At the same time, the monitor terminal receives video data transmitted from the video transmission terminal, expands it, and displays it in real time on the monitor screen.

Figure 4:
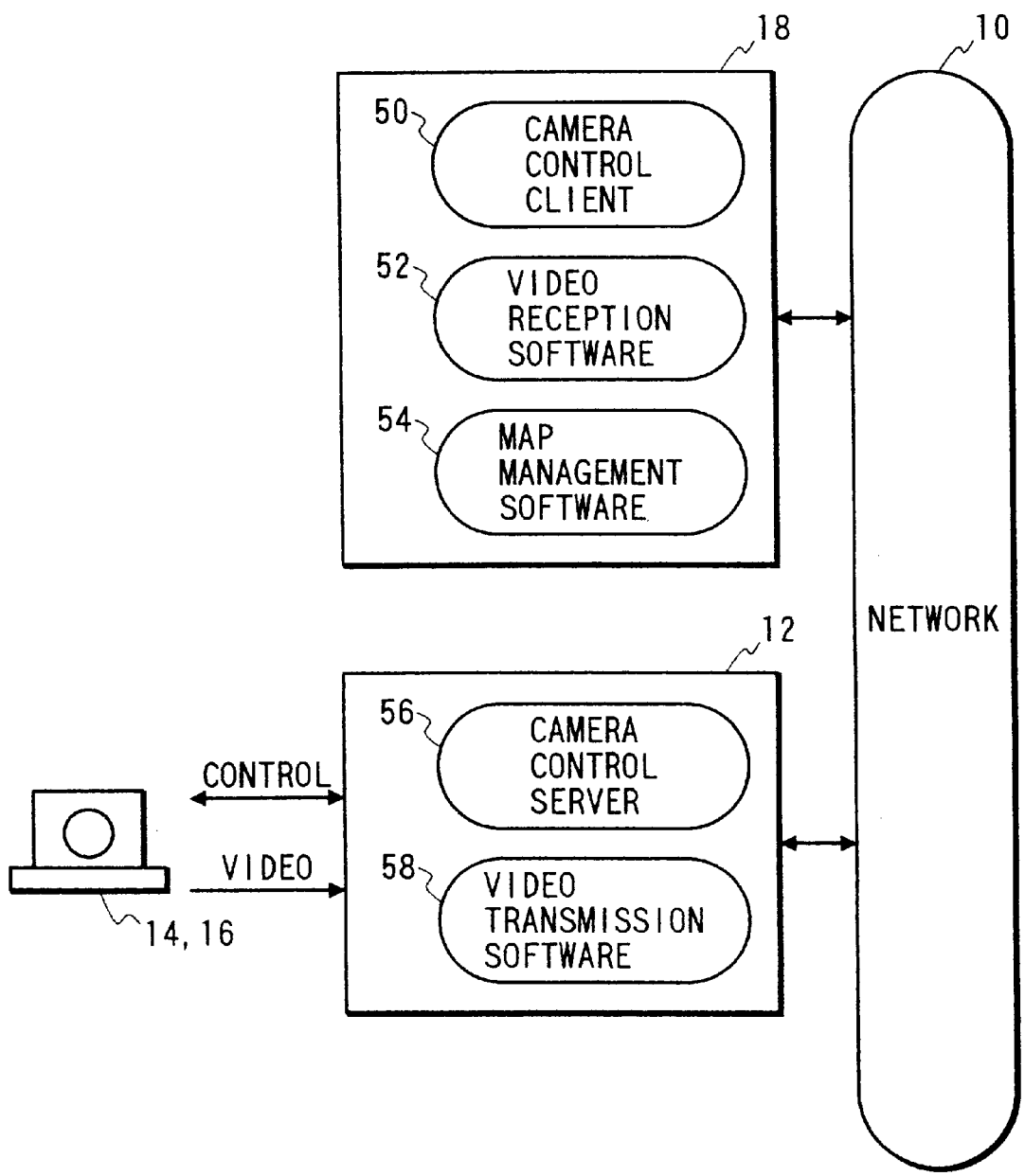
FIG. 4 is a block diagram showing the configuration of software of the first embodiment.

FIG. 4 illustrates the software configuration of this embodiment. The video reception terminal (monitor terminal) 18 is installed with camera control client software 50, video reception software 52, and map management software 54. The camera control client software 50 remotely controls the camera 16 via the network 10 and video transmission terminal 12. The video reception software 52 expands compressed video data supplied from the video transmission terminal 12. The map management software 54 displays a camera symbol representative of the current position and status of the camera 16 on a map, and also displays an operation panel for controlling the camera 16. A set of above-described software is stored either at the video transmission terminal 12 or video reception terminal 18 in its main storage medium or secondary storage medium.

The video reception software 52 also manages all the cameras 16 via the network 10 and video transmission terminals 12, and stores fixed information of each camera 16 and variable information thereof (e.g., a camera name, a host name of the computer connected to the camera, a camera status such as pan, tilt, and zoom, a controllable or uncontrollable state, a camera name under control, a camera name under display). Such fixed and variable information is also supplied to the camera control client software 50 and map management software 54 to change the display of the camera symbol or the like.

The video transmission terminal 12 is installed with camera control server software 56 and video transmission software 58. The camera control server software 56 controls the camera 16 via the camera controller 14 in response to a request from the camera client software 50, and notifies the requested terminal of the current status of the camera 16. The video transmission software 58 compresses video data output from the camera 16 in a predetermined compression format and transmits it via the network 10 to the requested terminal.

Figure 5:
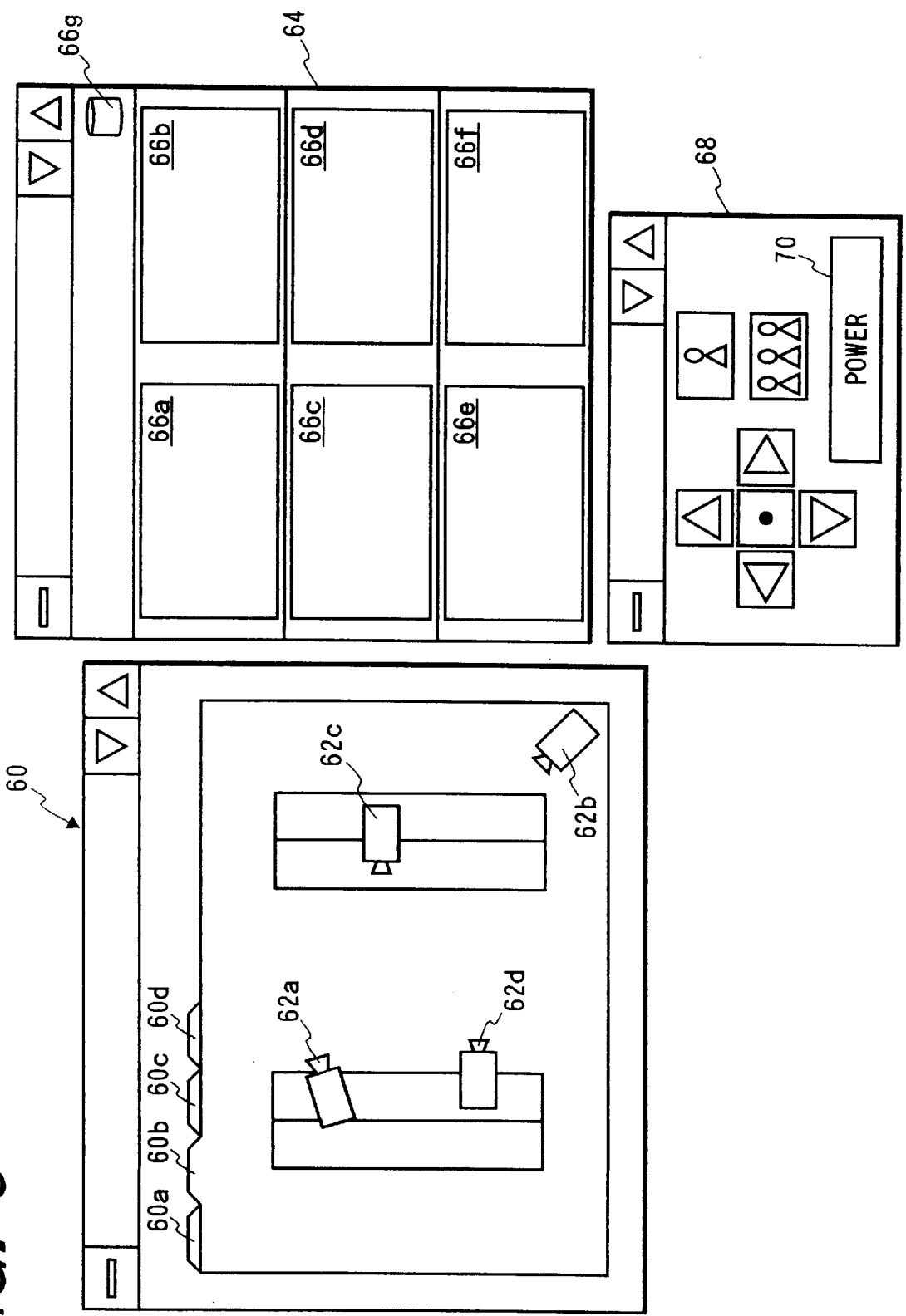
FIG. 5 shows examples of the display contents on the screen of the monitor terminal of the first embodiment.

FIG. 5 shows examples of the display contents of the monitor screen of the video reception terminal 18. Reference numeral 60 represents a map window showing a layout of, for example, an office, a store, or a warehouse in which cameras 16 are installed. In this map window, a plurality of maps 60a, 60b, 60c, and 60d can be selectively displayed. The number of maps which can be displayed depends upon the performance of the system and is not limited to a particular number. Each map 60a, 60b, 60c, 60d is provided with a tag. By clicking the tag with a mouse pointer, the map with the clicked tag is displayed at the front of the map window. The map displayed at the front also displays camera icons (camera symbols) 62a, 62b, 62c, and 62d of the cameras installed at this map. Each camera icon 62a, 62b, 62c, 62d is displayed being directed toward the direction of the camera 16.

Reference numeral 64 represents a video display window having a plurality of video display areas 66a to 66f. In this embodiment, six video display areas are used. Obviously the number of these areas is not limited to six. A trash-can icon 66g is displayed on the video display window 64 in order to stop displaying a camera image. A use method of the trash-can icon 66g will be later described.

Figure 13:
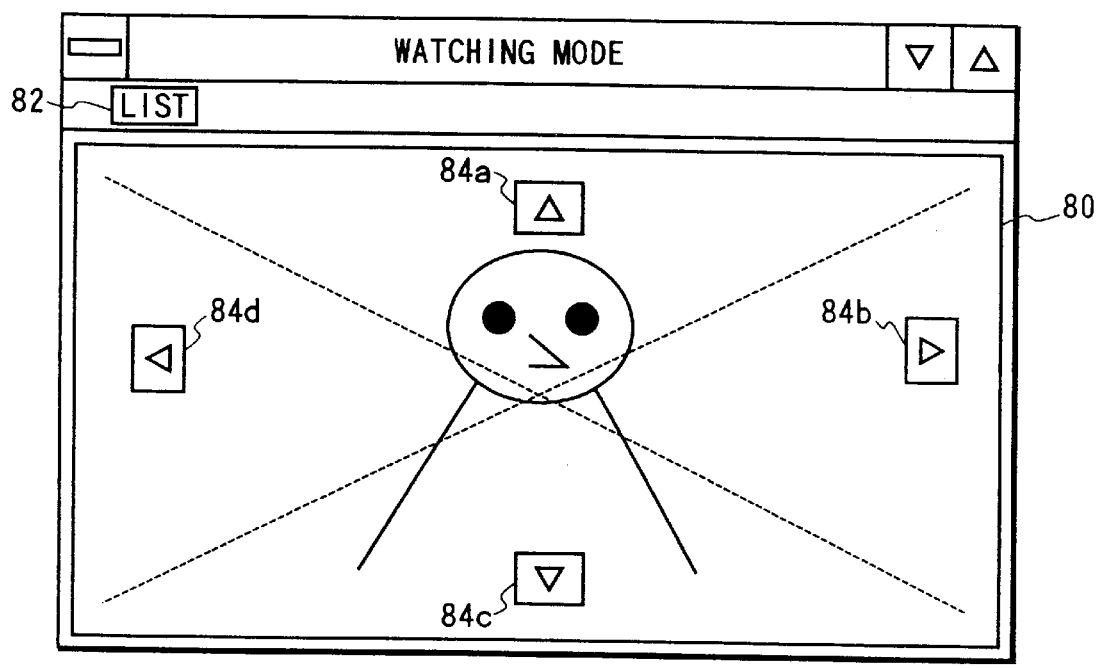
FIG. 13 is a diagram showing an example of an image display window in a watching mode.

The video display window 64 has two display modes, one for displaying all video display areas as shown in FIG. 5 and the other for displaying only one video image area as shown in FIG. 13 to watch the image in one video display area. The former is called a glance mode and the latter is called a watching mode. The watching mode is used when one image is viewed as a magnified image or it is viewed at high resolution. Switching between the glance mode and the watching mode will be later described.

Reference numeral 68 represents a camera control panel which is provided with buttons and the like for instructing the direction (pan/tilt), zoom, and the like of a designated camera, and in this embodiment, also with a camera power button 70 for instructing a power on/off of a designated camera.

Figure 6:
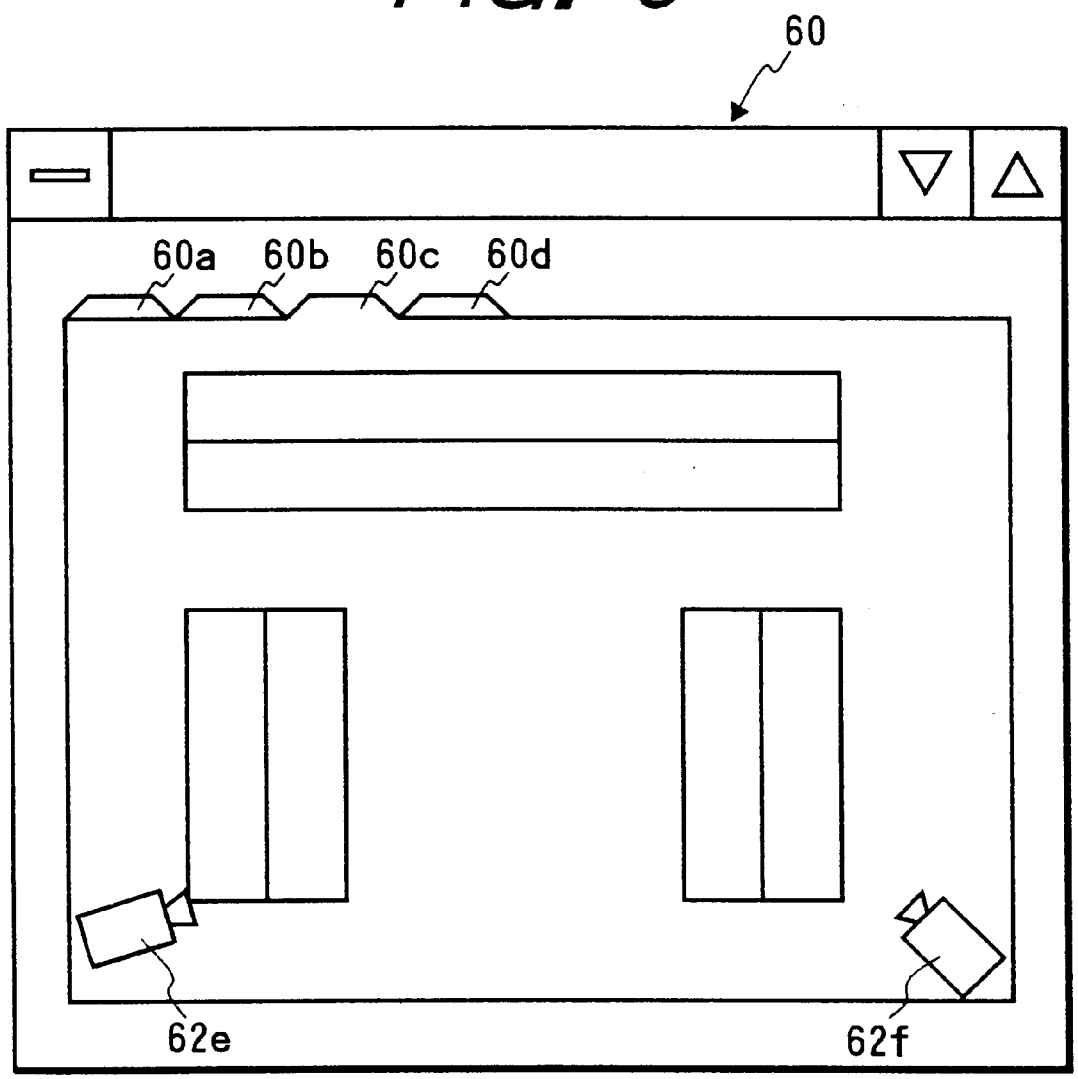
FIG. 6 is a diagram showing an example of a map window in which a map is displayed at the front of the window.

For example, when the map 60c is selected in the map window 60 and displayed at the front of the window, a map such as shown in FIG. 6 is displayed and camera icons 62e and 62f representing two cameras disposed in this map are also displayed.

The camera control of this embodiment will be detailed. If an image of a camera 16 is to be displayed, the camera icon of the camera 16 is selected in the map window 60 by moving the mouse 130 to one of the video display areas 66a to 66f in the video display window 64 and releasing the click button (so called drag-and-drop). Usually, one of the video display areas 66a to 66f not used is selected. However, if the video display area in use is selected, a warning is issued to the effect that the camera is to be changed, and a user is urged to select either "continue" or "stop". The basic operations of these processes are already known in the field of this art.

Figure 7:
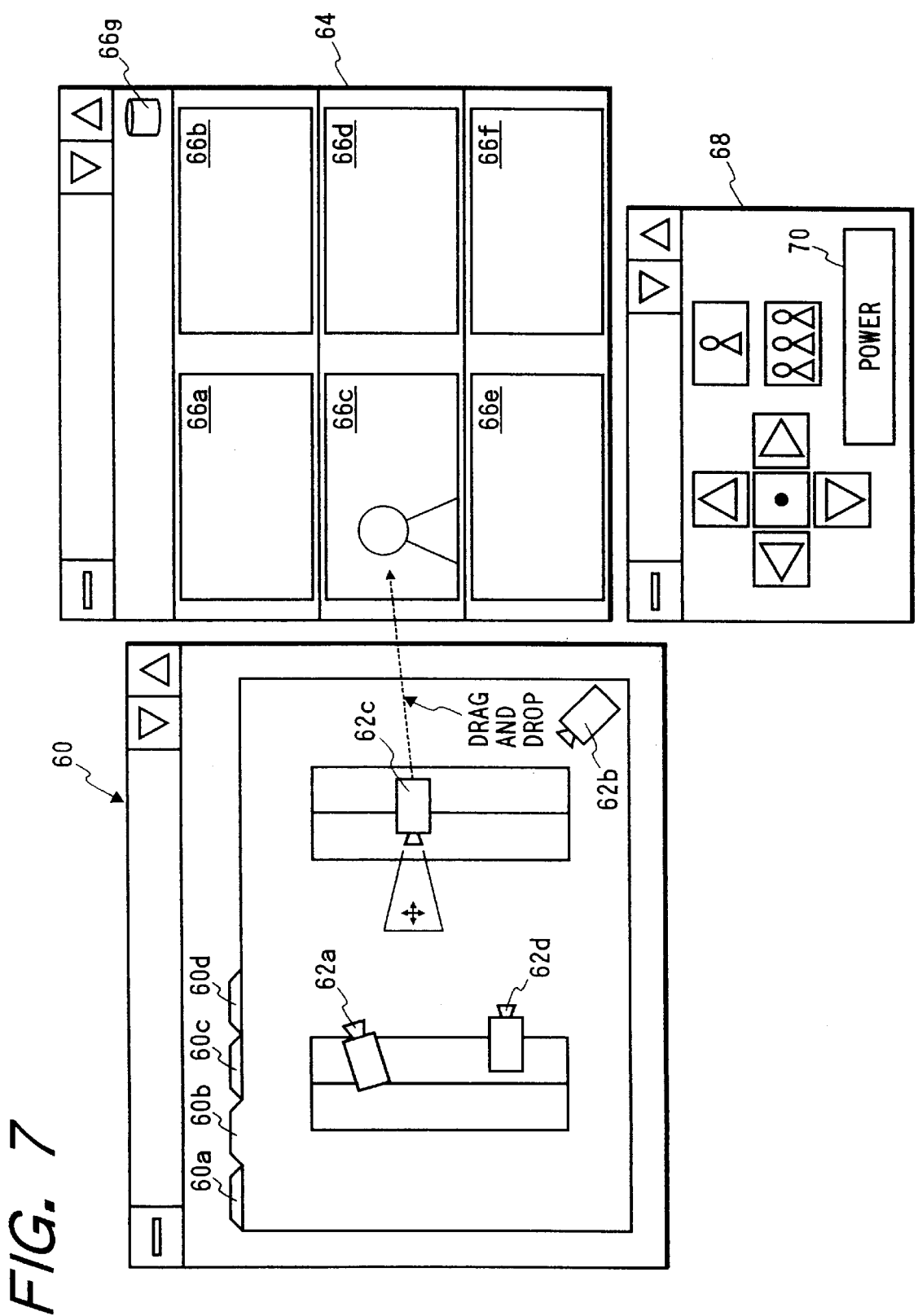
FIG. 7 illustrates an operation of starting an image display.
Figure 8:
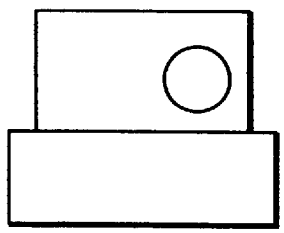
FIG. 8 is a diagram showing an example of the shape of a mouse cursor during the image display start operation.

FIG. 7 illustrates a drag-and-drop operation of the camera icon 62c to the video display area 66c. An image taken with the camera represented by the camera icon 62c is displayed in the video display area 66c. While the camera icon is dragged, the mouse cursor changes to a shape shown in FIG. 8 so that the user can recognize the dragging operation for displaying an image. The map management software 54 notifies the video reception software 52 of an ID of the camera represented by the camera icon, and the video reception software 52 checks from the ID the direction, name, and host name of the camera and notifies these pieces of information to the camera control client software 50 and map management software 54.

Next, the operation of controlling a camera will be described. Of the video display areas 66a to 66c, as the video display area (e.g., 66c) in which the image taken with the camera is displayed by the above operations is single clicked with the mouse 130, this designated camera enters a controllable state. At this time, a yellow frame is displayed on the video display area 66c to notify the user of the camera controllable state, and the camera control panel 68 is automatically displayed.

In accordance with the information supplied from the camera reception software 52, the camera control client software 50 accesses over the network the camera control server software 56 of the video transmission terminal 12 connected to the selected camera. Thereafter, the camera control client software 52 transmits over the network the camera control signal designated by the user operation to the camera control server software 56. In accordance with the received camera control signal, the camera control server software 56 notifies the current status of the camera 16 to the camera control client software 52. The camera control client software 52 notifies the current status to the map management software 54.

Figure 9:
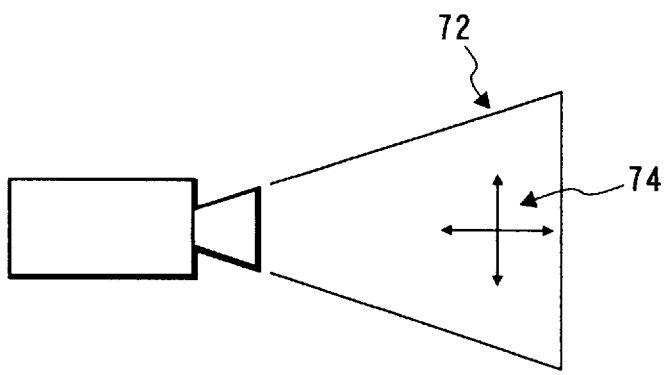
FIG. 9 is a diagram showing an example of a camera icon during the image display.

The map management software 54 changes the direction of the camera icon so as to match the direction of the camera 16, displays a scope 72 shown in FIG. 9 indicating that an image is under display, and displays a control pointer 74 in the scope 72 to be used for the control of pan/tilt and zoom. As described earlier, the map management software 54 is constantly notified by the video reception software 52 of variation information (particularly of pan/tilt information) of the camera 16 under display, and in accordance with this information, the direction of the camera icon 62a to 62f is changed so as to match the direction of the camera.

The camera control panel 68 may be used in common by all the video display areas 66a to 66f or may be provided for each of the video display areas. If a plurality of camera control panels 68 are provided, the video display areas 66a to 66f are given specific serial numbers which are given to the corresponding ones of the camera control panels 68. In this manner, a system can be realized which has a correspondence between images and camera control panels 68 easy to understand. Instead of serial numbers, names of cameras may be displayed or different colors may be allocated to the video display areas 66a to 66f.

Figure 10:
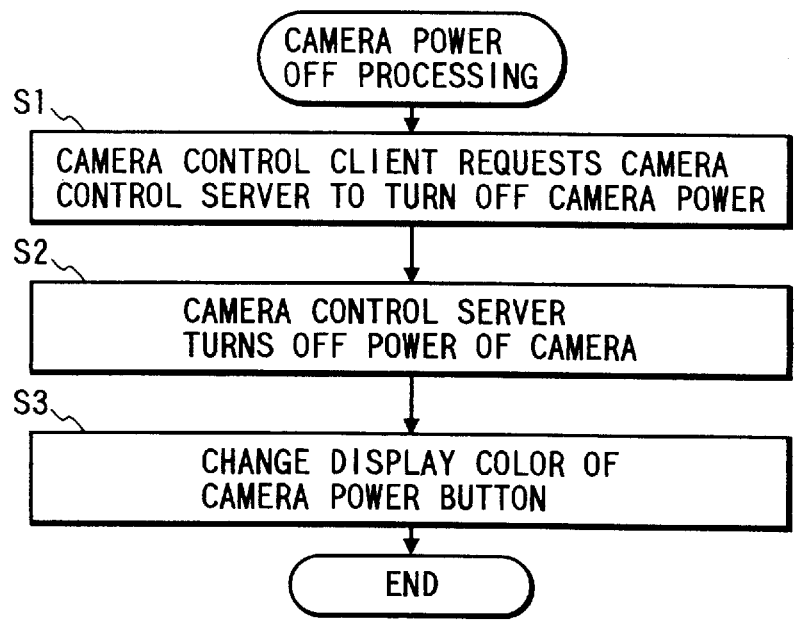
FIG. 10 is a flow chart illustrating a power turnoff process.

FIG. 10 is a flow chart illustrating the operation of turning off the power of any selected camera 16. If the power of the selected camera is to be temporarily turned off, the camera icon of the camera whose power is turned off is selected and the camera power button 70 in the camera control panel 68 is pressed. The camera power button 70 is displayed in different colors and/or characters (e.g., "power off" or "power on") in accordance with the state of the camera power. In response to the operation of the camera power button 70, the camera control client software 52 notifies over the network 10 the camera power-off request to the camera control server software 56 of the video transmission terminal 12 connected to the corresponding camera 16 (S1).

The camera control server software 56 causes the camera controller 14 via the I/O board 34 to turn off the power of the video camera 10 (S2). The camera power button 70 changes its display shape to indicate that the power is in an off-state (S3). In this manner, the user is notified that the camera power is in the off-state.

If the power is supplied again to the camera in the off-state, the camera icon is selected with the mouse 130 and thereafter the camera power button 70 is again pressed. In this case, a camera power-on request is issued to the camera control server software 56 to supply power to the corresponding video camera 16. The color of the camera power button 70 is changed to indicate the power-on state.

In the above manner, the power supply to any camera can be controlled by the monitor terminal 18 to save power consumption.

In accordance with a video transmission request from the video reception software 52, the video transmission software 58 transmits a camera image. More specifically, the video reception software 52 requests the video transmission software 58 of the video transmission terminal 12 connected to the selected camera over the network 10 to transmit video data of one frame. In response to this request, the video transmission software 58 compresses the video data of the latest frame supplied from the camera and divides it into packets which are then transmitted to the requested video reception software 52. The video reception software 52 reconfigures the received packets to generate a frame, and expands the compressed frame to display it in the designated one of the video display areas 66a to 66f. Thereafter, the video reception software 52 issues again the video transmission request. By repeating these processes, the video reception terminal 18 receives the images at the remote camera over the network and displays them.

If the images of a plurality of cameras are displayed at the same time, the video transmission request is issued to the video display transmission software 58 of the video transmission terminal 12 connected to each camera, and the image is received and displayed. These operations are cyclically performed for the cameras.

Figure 11:
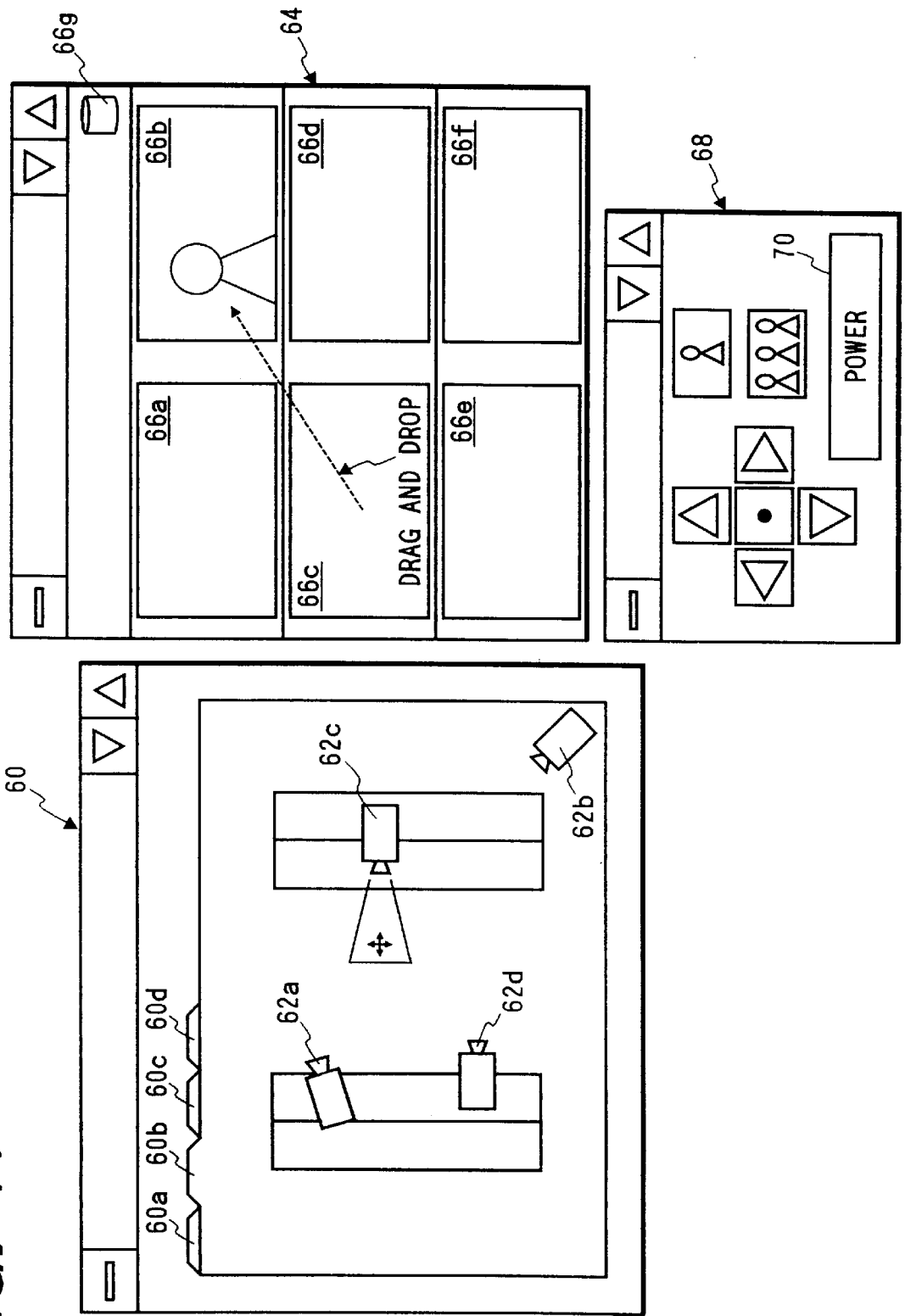
FIG. 11 is a diagram illustrating the operation of changing a video display area.

Changing the display position of a received camera image can be performed also by the drag-and-drop operation. For example, as illustrated in FIG. 11, if the video display area 66c is to be changed to the video display area 66b, the mouse pointer is moved to the video display area 66c. After the mouse is clicked and maintained in this state, the mouse pointer is moved to the video display area 66c whereat the mouse button is released.

With the above operations, the video reception software 52 stops displaying an image in the first selected video display area (area 66c in FIG. 11), and starts displaying the image in the next selected video display area (area 66b in FIG. 11). During this operation, the network connection is not intercepted.

In order to watch an image in a particular video display area (e.g., area 66a) during the glance mode, this display area is double clicked with the mouse. Then, the video display window 64 is switched to the watching mode of watching the image. FIG. 13 shows the video display window in the watching mode. A window 80 is called a watching display window. Reference numeral 82 represents a mode switch button used for returning to the glance mode. Reference numerals 84a, 84b, 84c, and 84d represent cursors for controlling the direction of the camera to display an image in conformity with the camera direction.

Figure 14A:
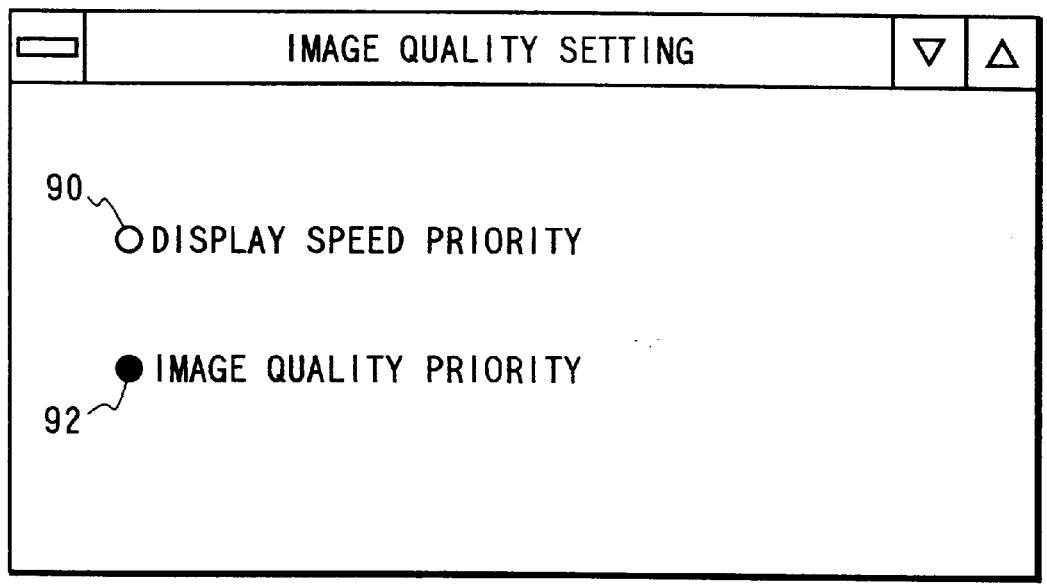
FIGS. 14A and 14B are diagrams showing examples of an image quality setting panel.

In the watching mode, one image is displayed in a magnified scale. In this case, it is possible to select either a smooth motion display which gives a priority of a display speed (frame rate) or a high resolution display which gives a priority of an image quality by increasing the data amount per one frame. FIG. 14A shows an image quality setting window for setting the high resolution display. Reference numeral 90 represents a display speed priority button, and reference numeral 92 represents an image priority button. One of these buttons 90 and 92 can be selected at a time. The image quality setting window is displayed on the monitor upon instruction by the watching mode. When the display is selected in the image quality setting window, a corresponding image of the watching mode is displayed.

Next, the operation of the watching mode after the image quality priority button 92 is pressed will be detailed. First, the video reception software 52 notifies the video transmission software 58 of the corresponding video transmission terminal 12 of a high resolution request over the network 10. Upon reception of this high resolution request, the video transmission software 58 switches the transmission image to the high resolution. The video reception software 52 receives the high resolution image and displays it in the watching display window 80. In this case, since the high resolution image has a data amount larger than the standard resolution image, the display speed lowers in some cases.

As the mode switch button 82 is pressed or the watching display window 80 is double clicked with the mouse, the video display window 64 resumes the glance mode. The video reception software 52 notifies the video transmission software 52 of the corresponding video transmission terminal 12 of a standard resolution request over the network 10. Upon reception of the standard resolution request, the video transmission software 58 changes the transmission image to the standard resolution.

Next, the operation of the watching mode after the display speed priority button 90 is pressed will be described. In this case, the video reception software 52 notifies nothing to the video transmission software 58. The video reception software 52 magnifies the image transmitted at the standard resolution and displays it in the watching display window 80. The operation of returning to the glance mode is the same as the case the image quality button 92 is selected.

In the mode selection, although the image resolution is controlled, an image compression ratio or an image transmission rate may be controlled.

Next, the operation of controlling a camera in the watching mode will be described. Similar to the glance mode, the motion of a camera can be controlled in the watching mode by using the camera control panel 68. The camera can be controlled also by pressing the button of the mouse in the watching display window. As indicated by broken lines in FIG. 13, depending upon the position of the mouse cursor in one of the upper/lower and right/left areas in the watching display window 80, the mouse cursor changes to one of the camera direction control cursors 84a to 84d. When the mouse button is pressed, the direction of the camera is changed to one of the upper/lower and right/left directions.

Although the video reception terminal does not display other images on the monitor during the watching mode, the communication with the corresponding video transmission terminals is maintained. As a result, when the watching mode is terminated, the monitor can be changed to the multi-image display state at high speed.

Figure 14B:
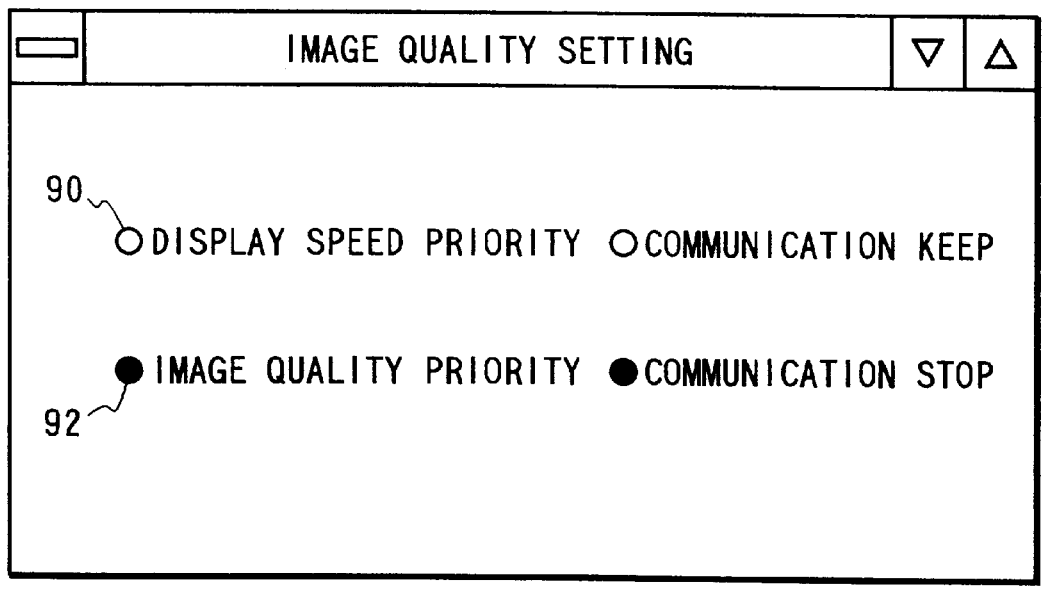

It is obvious that in response to a mode change instruction to the watching mode, communications with the other video transmission terminals may be intercepted to shift to the image quality priority mode or display speed priority mode. Alternatively, as shown in FIG. 14B, a communication keep button and a communication stop button may be provided in the image quality setting window in order to instruct, when the watching mode is designated, to keep or stop communications with the other video transmission terminals.

Therefore, in the watching mode, the designated terminal can be assigned a broad channel band so that an image of high resolution can be transmitted and an image of a high frame rate can be transmitted.

Figure 12:
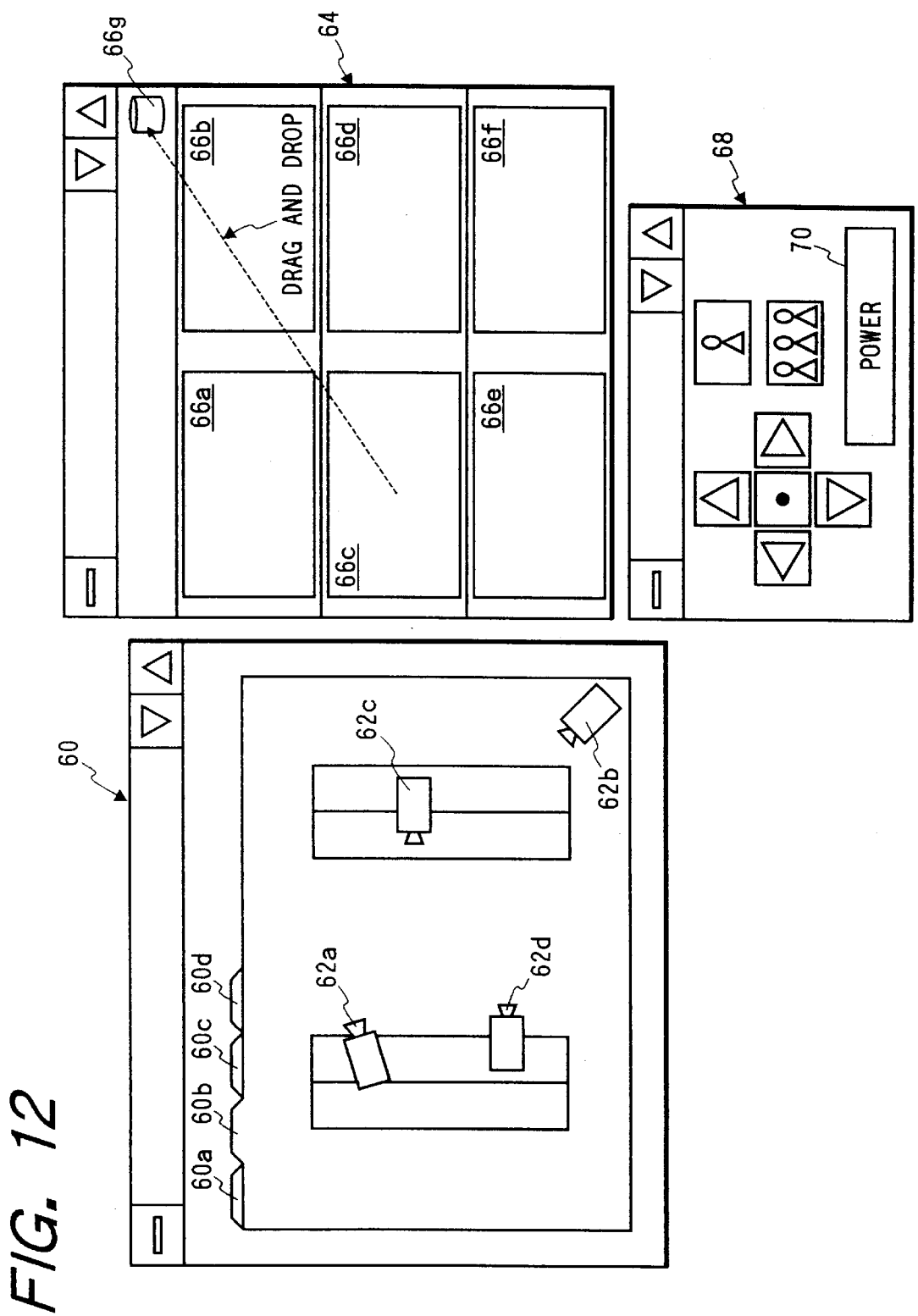
FIG. 12 is a diagram illustrating the operation of stopping an image display.

If the image display is to be terminated, the image displayed in the video display area is dragged and dropped in the trash-can icon 66g. FIG. 12 illustrates an operation of stopping the display of an image in the video display area 66c. The mouse pointer is moved to the video display area 66c and the mouse button is pressed. In the state of the pressed mouse button, the mouse pointer is moved to the trash-can icon 66g whereat pressing the mouse button is released.

In response to the above operations, the video reception software 54 stops issuing the video transmission request to the video transmission software 58 of the video transmission terminal connected to the camera which displays the image in the selected video display area (area 66c in FIG. 12). Furthermore, the video reception software 54 notifies the image display termination to the camera control client software 50 and map management software 54. In response to this notice, the camera control client software 50 disconnects the network connection to the camera control server software 56 of the corresponding video transmission terminal 12 to clear its video display area (area 66c in FIG. 12). The map management software 54 erases the scope display of the camera icon (e.g., icon 62c) of the corresponding camera to update the map.

In this embodiment, the camera symbol in the map is dragged and dropped in the video display area to establish the network connection between the video reception and transmission terminals. The image display position can be changed by a drag-and-drop operation between the video display area in which a camera image is displayed and another optional video display area. An image display can be stopped by a drag-and-drop operation from the video display area in which a camera image is displayed to the display stop symbol. As above, it becomes very easy to start a camera image display, change a display position, and stop an image display. Obviously, images are not limited to only camera images, but other images may be used such as images generated from a storage medium such as a video tape.

<Second Embodiment>

Figure 15:
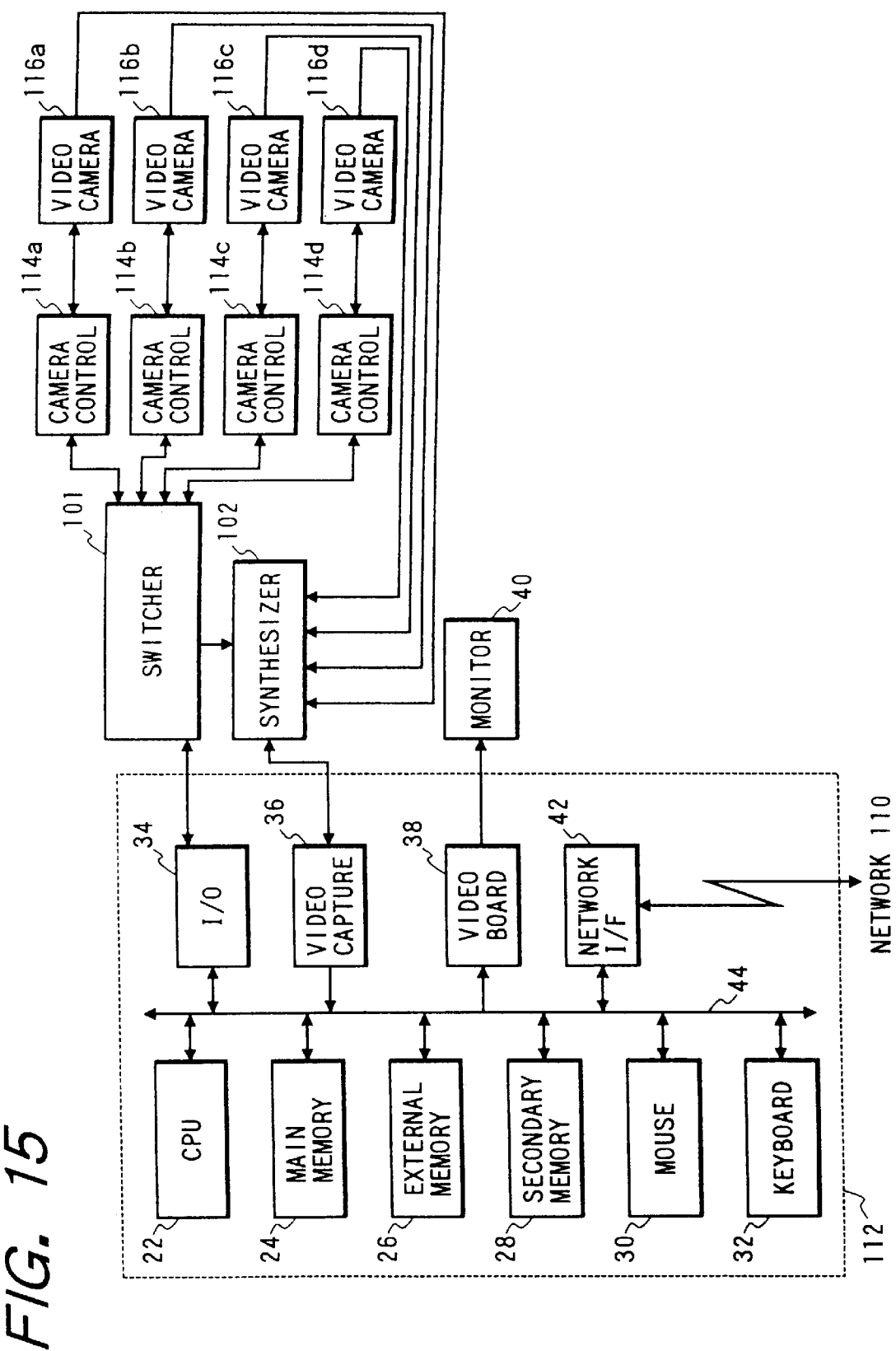
FIG. 15 is a block diagram briefly showing the overall structure of a system according to a second embodiment of the invention.

FIG. 15 is a block diagram showing the outline structure of a video transmission terminal 112 having a switcher and a synthesizer connected thereto. Similar to the first embodiment, the video transmission terminal 112 is connected to a network 110 to which a plurality of video transmission and reception terminals are connected.

In the first example shown in FIG. 2, one video camera is connected to one video transmission terminal. In the second embodiment, four camera controllers 114a to 114d are connected to the switcher 101 and four video cameras 116a to 116d are connected to the synthesizer 102.

The synthesizer 102 will be described. The synthesizer 102 synthesizes moving image analog signals supplied from the video cameras 116a to 116d, as indicated at 166a in FIG. 16. As indicated at 66a in FIG. 17, an image of each video camera can be selectively displayed by sending a command from the video transmission terminal to the synthesizer 102 via the switcher 101.

The switcher 101 will be described. As different from the structure shown in FIG. 2, the structure shown in FIG. 15 has four camera controllers connected to the switcher 101. In order for the computer to control the video camera, the camera controllers 114a to 114d are required to be switched. The switcher 101 performs this function. As described before, as the command is sent to the synthesizer 102, moving image signals from the video cameras can be selected or synthesized.

Figure 18:
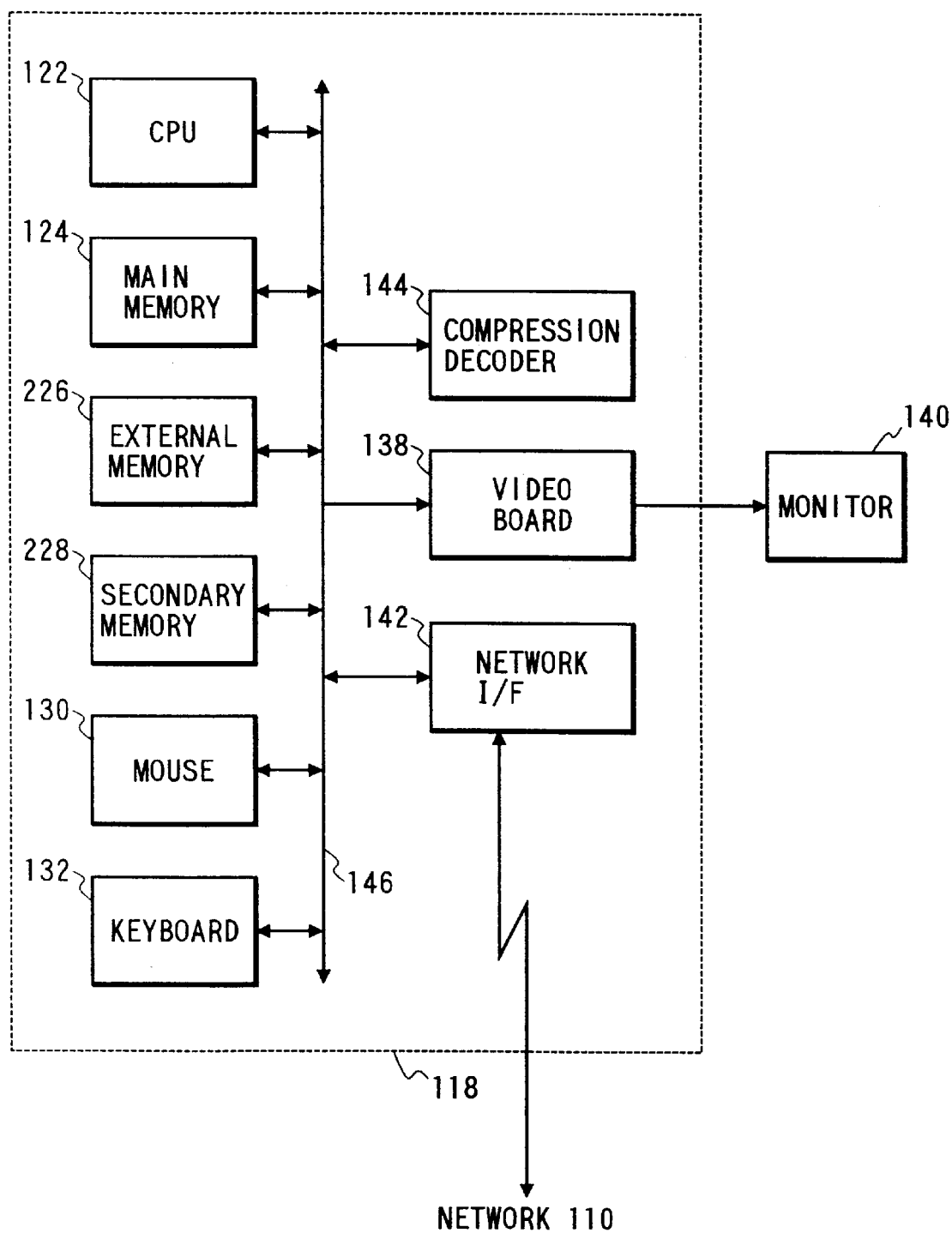
FIG. 18 is a block diagram showing the outline structure of the video reception terminal (monitor terminal) of the second embodiment.

FIG. 18 is a block diagram showing the outline structure of the video reception terminal (monitor terminal) 118. The video reception terminal has the same hardware structure as the first embodiment, but has different software.

Figure 19:
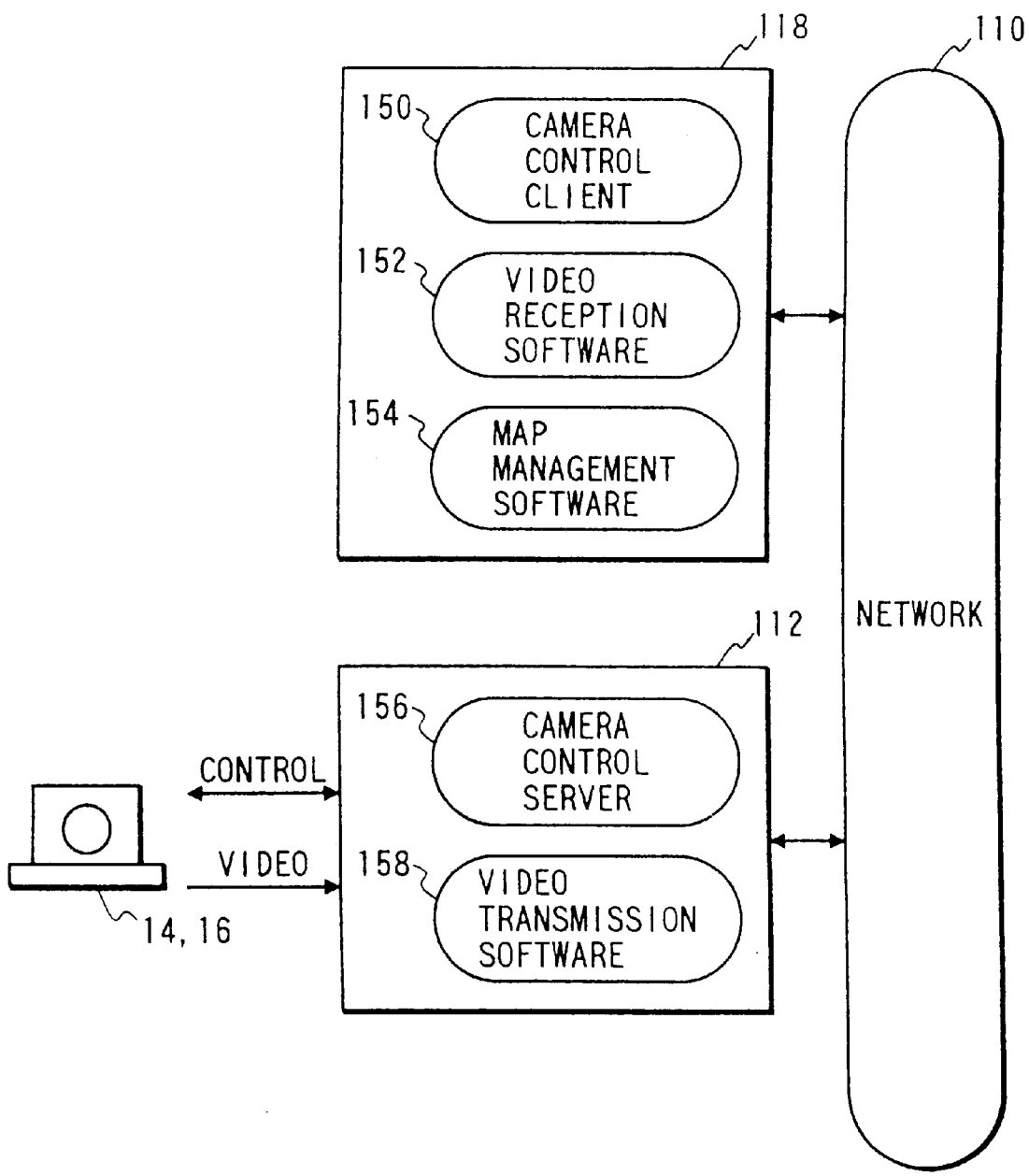
FIG. 19 is a block diagram showing the outline structure of software of the second embodiment.

FIG. 19 illustrates the software configuration of this embodiment. The video reception terminal (monitor terminal) 118 is installed with camera control client software 150, video reception software 152, and map management software 154. The camera control client software 150 remotely controls the cameras 116a to 116d via the network 110 and video transmission terminals 112. The video reception software 152 expands compressed video data supplied from the video transmission terminal 112. The map management software 154 displays a camera symbol representative of the current position and status of each camera 116a to 116d on a map, and also displays an operation panel for controlling each camera 116a to 116d. Similar to FIG. 1, to the network 110 a plurality of video transmission terminals 112-1 to 112-n and video reception terminals 118-a to 118-n are connected.

The video reception software 152 also manages all the cameras 116 via the network 110 and video transmission terminals 112, and stores fixed information of each camera 116 and variable information thereof (e.g., a camera name, a host name of the computer connected to the camera, a camera status such as pan, tilt, and zoom, a controllable or uncontrollable state, a camera name under control, a camera name under display). Such fixed and variable information is also supplied to the camera control client software 150 and map management software 154 to change the display of the camera symbol or the like. A set of above-described software is stored either at the video transmission terminal 112 or video reception terminal 118 in its main storage medium or secondary storage medium.

The video transmission terminal 112 is installed with camera control server software 156 and video transmission software 158. The camera control server software 156 controls the camera 116 via the camera controller 114 in response to a request from the camera client software 150, and notifies the requested terminal of the current status of the camera 116. The video transmission software 158 compresses video data output from the camera 116 in a predetermined compression format and transmits it via the network 110 to the requested terminal.

As shown in FIG. 15, for the control of the video cameras 116a to 116d via the switcher 101, the camera control server software 156 supplies the switcher 101 with a command for selecting a video camera to be controlled, so that the switcher 101 is connected to the corresponding camera controller of the video camera. Thereafter, in response to a request from the camera control client software 150, the video camera is controlled by the switcher 101 and camera controller 114 connected thereto.

Figure 20:
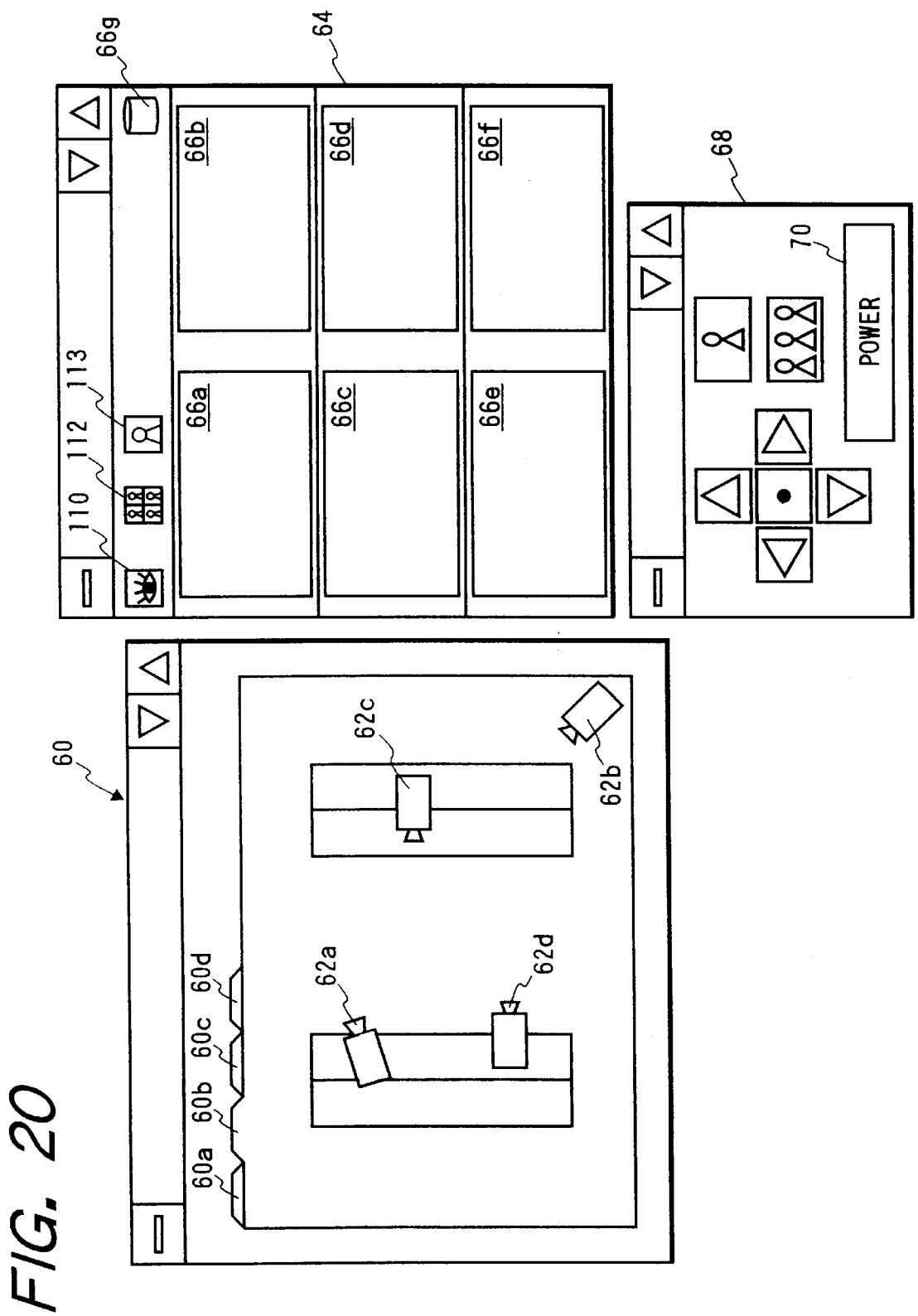
FIG. 20 is a diagram showing a monitor example of the monitor terminal of the second embodiment.
Figure 21:
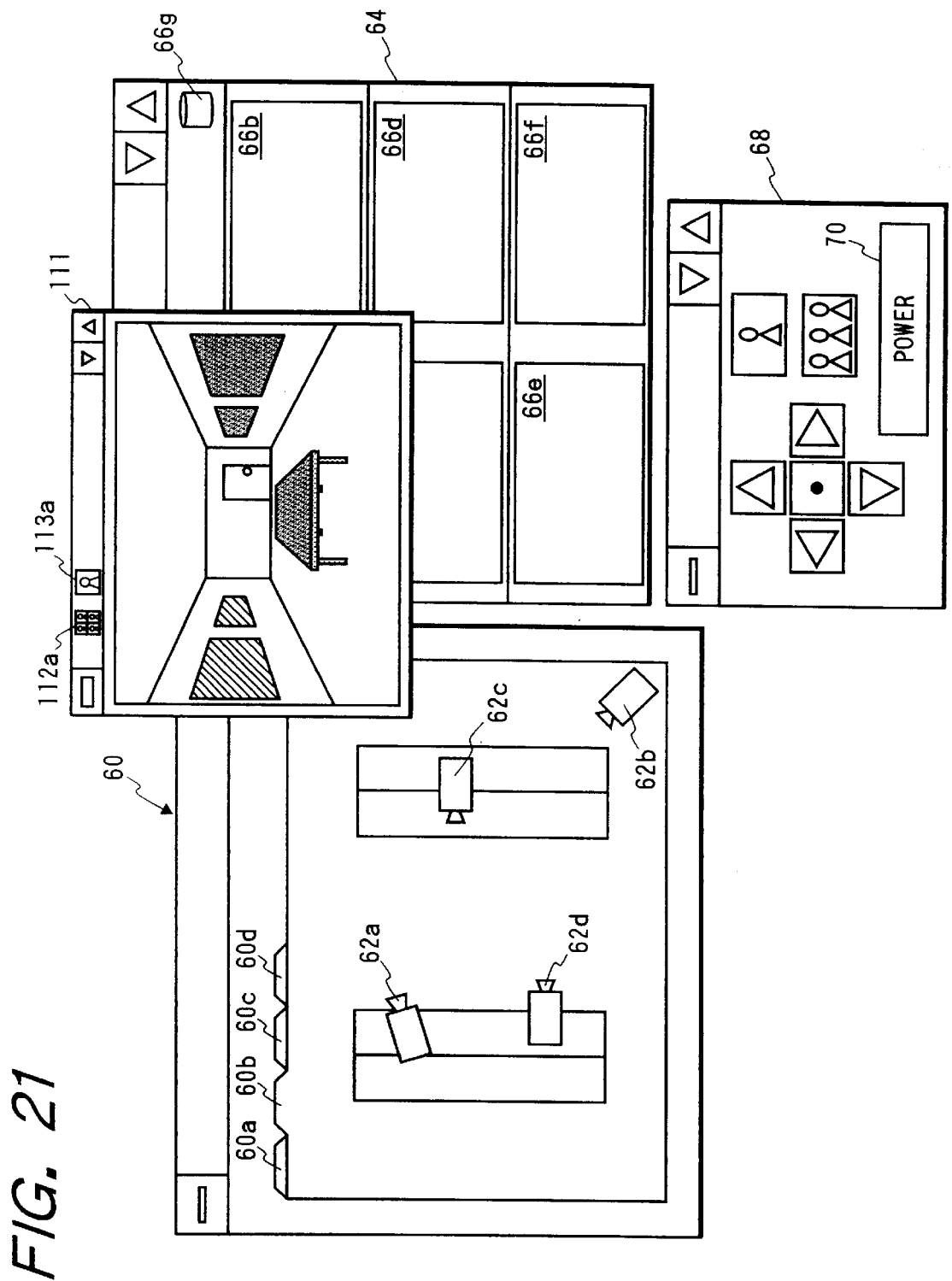
FIG. 21 is a diagram showing a display example when the single image display window is popped up.

FIG. 20 shows examples of the display contents of the monitor screen of the video reception terminal 118. Like constituents to those shown in FIG. 5 are represented by identical reference numerals and the description thereof is omitted. Reference numeral 110 represents a single image display mode button. When this button is clicked, as indicated at 111 in FIG. 21, a new window is popped up and only the selected moving image is displayed. When the single image display mode button is clicked, a command for stopping image transmission is sent to the video transmission terminals other than the selected terminal, and a command for increasing a frame rate or raising a resolution is sent to the selected terminal in order to efficiently utilize the capacity of empty channels.

Whether the command for increasing a frame rate or raising a resolution is determined in accordance with initial setting made by a user. Obviously, with this initial setting, a balanced setting of both the frame rate and resolution may be set.

In FIG. 20, reference numeral 112 represents a four-image simultaneous display button, and reference numeral 113 represents a selective display button. These buttons are made valid only when the video transmission terminal is selected which is connected to the four video cameras via the synthesizer and switcher shown in FIG. 15. Assuming that the image at 66a in the video display area 64 is supplied from the video transmission terminal shown in FIG. 15, the four-image simultaneous display button 112 and selective display button 113 become valid when the image 66a is selected by the mouse.

Figure 16:
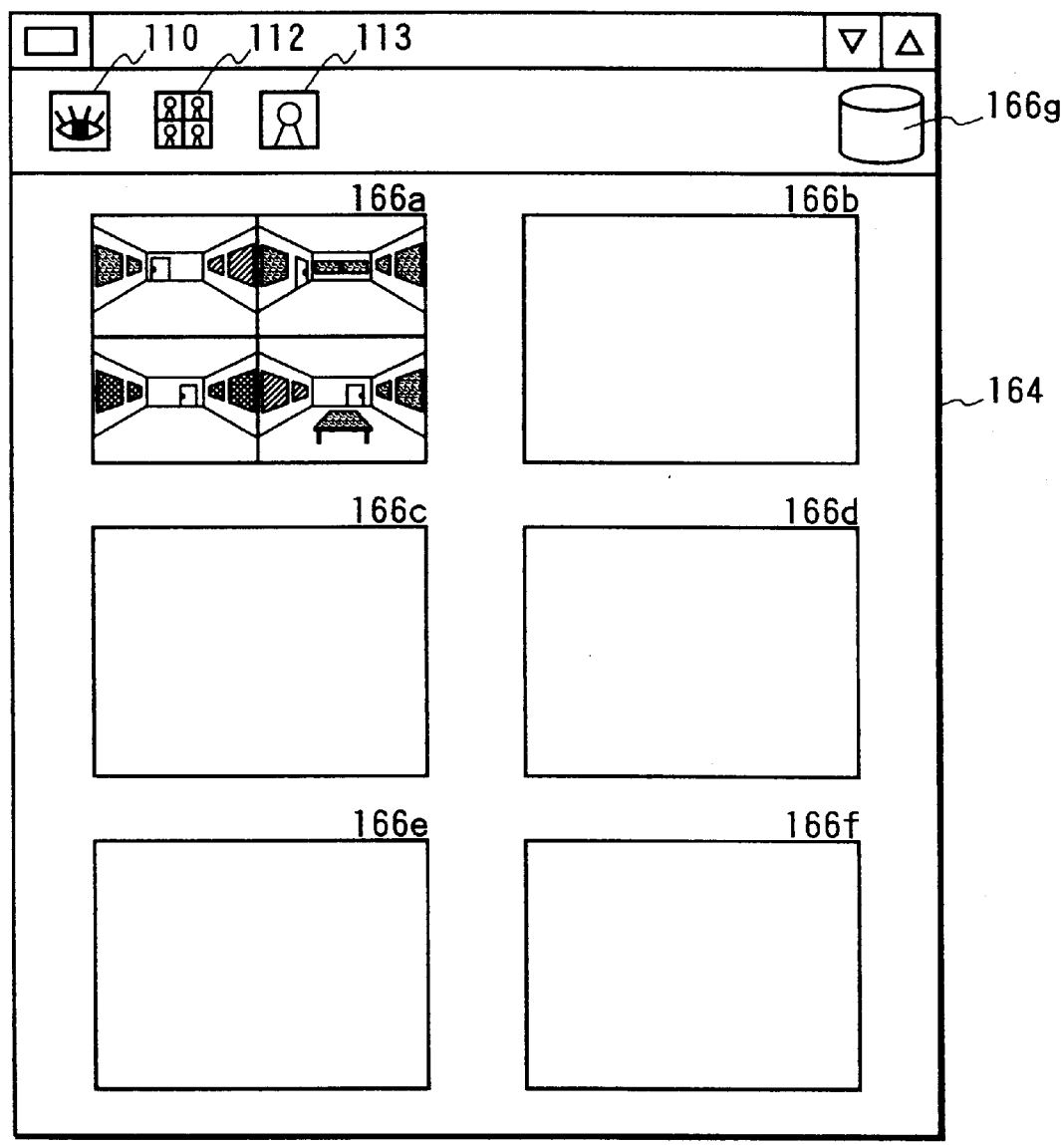
FIG. 16 is a diagram showing a display example in the glance display mode, a synthesized image of images being displayed which are supplied from a video transmission terminal connected to a plurality of video cameras via the synthesizer and switcher.
Figure 17:
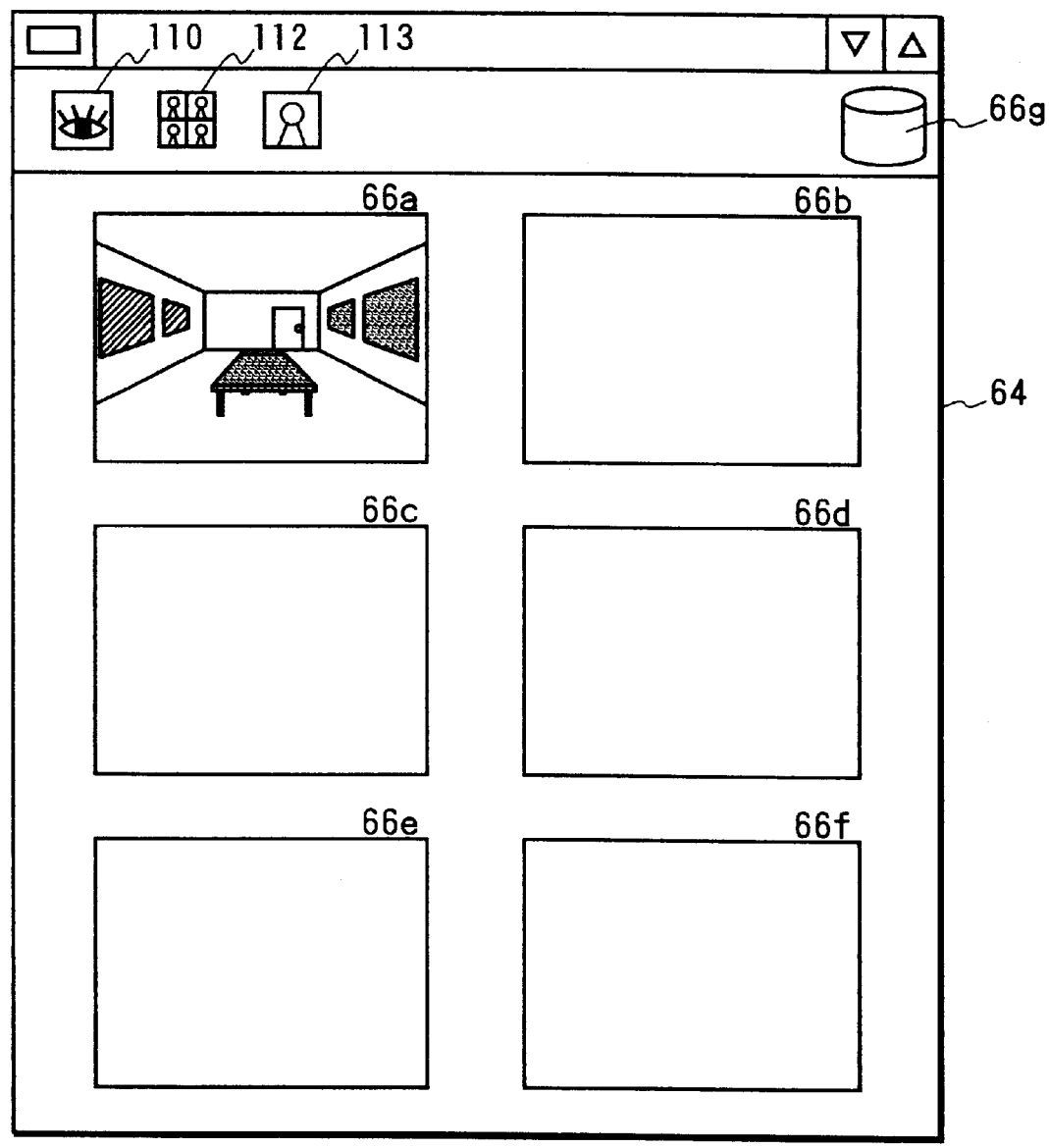
FIG. 17 is a diagram showing a display example in the glance display mode, a single image being displayed which is selected from images taken with a plurality of video cameras connected via the synthesizer and switcher to the video transmission terminal.

For example, if the lower right image among the four images displayed simultaneously as shown in FIG. 16 is clicked and thereafter the selective display button 113 is clicked, then the image shown in FIG. 17 is displayed. If the image 66a shown in FIG. 17 is clicked and thereafter the four-image simultaneous display button 112 is clicked, the images shown in FIG. 16 are displayed.

If the selected tag 60a to 60d has a video transmission terminal which does not use the switcher and synthesizer, the buttons 112 and 113 are not displayed. A video transmission terminal having the switcher and synthesizer is discriminated from other terminals by exchanging the current status between the video transmission and reception terminals displayed when the map is switched.

Next, the single image display mode will be described. As one of the image display areas 66a to 66f is clicked with the mouse 130 and thereafter the single image display mode button 113 is clicked, the single image display window 111 shown in FIG. 22 is popped up and the selected image is displayed.

Next, consider the switching to the single image display mode from the state that four images are displayed from the video transmission terminal having four video cameras via the synthesizer and switcher shown in FIG. 15. The images shown in FIGS. 16 and 17 are those images supplied from the video transmission terminal shown in FIG. 15.

Figure 22:
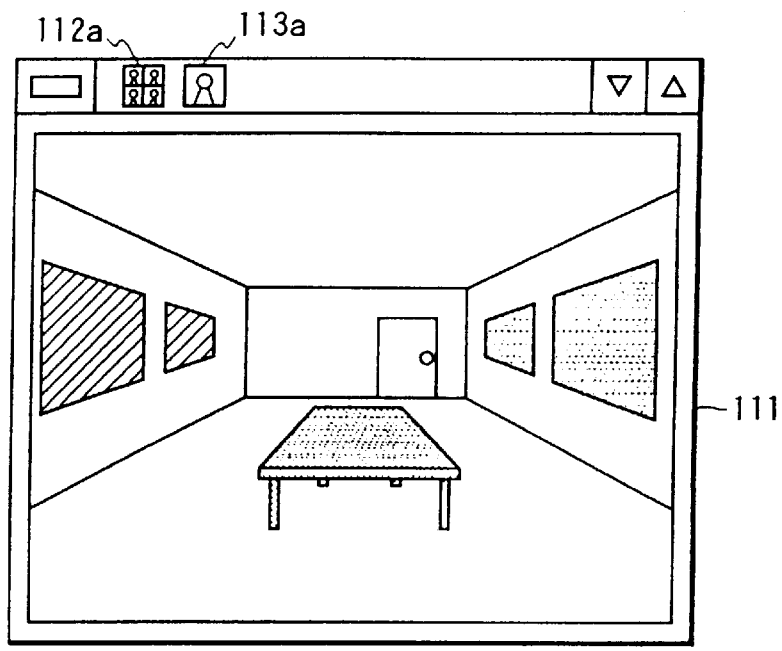
FIG. 22 is a diagram showing a display example in the single image display mode, a single image being displayed which is selected from images taken with a plurality of video cameras connected via the synthesizer and switcher to the video transmission terminal.
Figure 23:
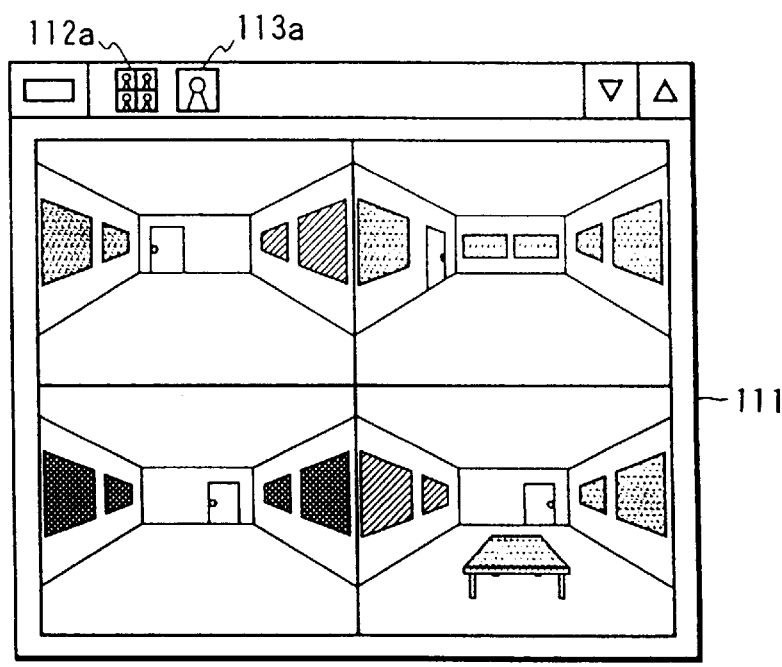
FIG. 23 is a diagram showing a display example in the glance display mode, a synthesized image of images being displayed which are supplied from a video transmission terminal connected to a plurality of video cameras via the synthesizer and switcher.

As the single image display mode button 110 is clicked while the images shown in FIG. 16 are displayed, the single image display window 111 shown in FIG. 23 is popped up. Since these images are supplied from the video transmission terminal having four video cameras via the synthesizer and switcher, the four-image simultaneous display button 112a and selective display button 113a are displayed in the single image display window 111. In this case, if the lower right image shown in FIG. 23 is clicked with the mouse and thereafter the selective display button 113a is clicked, the image shown in FIG. 22 is displayed.

Similar to switching to the single image display mode, the image shown in FIG. 22 has a good image quality because of the improved frame rate and resolution effected in response to the command.

If the single image display mode button 110 is clicked while the image shown in FIG. 17 is displayed, the single image display window 111 shown in FIG. 22 is popped up. Since this image is supplied from the video transmission terminal connected to four video camera via the synthesizer and switcher, the four-image simultaneous display button 112a and selective display button 113a are displayed in the single image display window 111. In this case, as the four-image simultaneous display button 112a is clicked with the mouse, four images shown in FIG. 23 are displayed at the same time.

In this embodiment, even in the single image display mode, images from the video transmission terminal connected to four video cameras via the synthesizer and switcher can be synthesized or selected. Therefore, image synthesis and selection can be easily performed by a user without confirming whether the operation mode is the single image display mode or the glance image display mode.

<Other Embodiments>

Programs realizing the structures and functions of the above embodiments may be stored in a storage medium. In this case, a method of realizing the above embodiments with such programs and the storage medium constitutes other embodiments of this invention.

Such a storage medium may be a floppy disk, a hard disk, an optical disk, a magnetooptical disk, a CD-ROM, a magnetic tape, a non-volatile memory card, and a ROM.

Other types of embodiments of this invention include not only for the case wherein the embodiment functions are realized by executing the program stored in the storage medium but also for the case wherein the programs are executed on an OS together with other application software and functions of other expansion boards.

What is claimed is:

1. A communication system comprising:

reception means for receiving images generated by image generating units of a plurality of communication terminals;

output means for outputting a multi-image of images received by said reception means to a display unit;

designation means for designating an arbitrary image from the images constituting the multi-image; and processing means for controlling the output form of an image to be output to the display unit, the image being designated by said designation means, when a designation operation by said designation means is a first designation operation, and for setting the communication terminal as a control object, the communication terminal generating an image designated by said designation means, when a designation operation by said designation means is a second designation operation.

2. A communication system according to claim 1, wherein said designation means is a mouse and the first designation operation is a double click.

3. A communication system according to claim 1, wherein said designation means is a mouse and the second designation operation is a single click.

4. A communication system according to claim 1, wherein controlling the output form is to control to change the multi-image to a mono-image of the image designated by said designation means.

5. A communication system according to claim 1, wherein the image generating unit is a video camera.

6. A communication system according to claim 1, wherein the image generating unit is a video recorder.

7. A communication system according to claim 1, further comprising display means for displaying the mount positions of the plurality of communication terminals, wherein said processing means changes the display state of the mount position of the communication terminal which generates an image designated in response to the first designation operation.

8. A communication system according to claim 4, wherein said processing means outputs a command to the communication terminal which generates an image designated in response to the first designation operation, the command being used for controlling to lower a compression factor of the image.

9. A communication system according to claim 4, wherein said processing means outputs a command to the communication terminal which generates an image designated in response to the first designation operation, the command being used for controlling to increase a resolution of the image.

10. A communication system according to claim 1, further comprising control means for displaying an operation area on the display unit, the operation area being used for controlling the communication terminal which generates an image designated in response to the second designation operation.

11. A communication system according to claim 1, wherein a predetermined image is synthesized with an image designated in response to the second designation operation in order to make the image discriminable from other images.

12. A communication system according to claim 10, wherein said control means displays the operation area affixed with a number or developed with a color, the number or color corresponding to the communication terminal which generates the designated image.

13. A communication system according to claim 10, wherein when a plurality of images constituting the multi-image are designated by the second designation operation, said control means displays as many operation areas as the number of the plurality of designated images.

14. A communication system according to claim 10, wherein said control means displays the operation area corresponding to each communication terminal which generates an image designated by the second designation operation, by synthesizing information with the operation area, the information being capable of discriminating each communication terminal from other terminals.

15. A communication method comprising the steps of:
receiving images generated by image generating units of a plurality of communication terminals;
outputting a multi-image of received images to a display unit;
designating an arbitrary image from the images constituting the multi-image; and
controlling the output form of a designated image to be output to the display unit when a designation operation is a first designation operation, and setting the communication terminal generating a designated image as a control object when a designation operation is a second designation operation.

16. A communication system having a first display mode for displaying images received from a plurality of video transmission terminals on a monitor at the same time and a second display mode for displaying an image received from an arbitrary one of the plurality of video transmission terminals, wherein:
when the arbitrary one is connected to a synthesizer in the second display mode, an operation area for controlling the synthesizer is displayed on the monitor.

17. A communication system according to claim 16, wherein in response to an operation upon the operation area for controlling the synthesizer, the second display mode displays a multi-image synthesized from images supplied from other video transmission terminals connected to the synthesizer and an image supplied from the arbitrary one.

18. A communication system according to claim 16, wherein the image supplied from the arbitrary one during the second display mode is displayed in a size larger than the sizes of images supplied from the plurality of video transmission terminals during the first display mode.

19. A communication system according to claim 16, wherein the image supplied from the arbitrary one during the second display mode is displayed at a frame rate higher than the frame rates of images supplied from the plurality of video transmission terminals during the first display mode.

20. A communication system according to claim 16, wherein the image supplied from the arbitrary one during the second display mode is displayed at a resolution higher than the resolutions of images supplied from the plurality of video transmission terminals during the first display mode.

21. A communication system having a first display mode for displaying images received from a plurality of video transmission terminals on a monitor at the same time and a second display mode for displaying an image received from an arbitrary one of the plurality of video transmission terminals, wherein:
when the arbitrary one is connected to a switcher in the second display mode, an operation area for controlling the switcher is displayed on the monitor.

22. A communication system according to claim 21, wherein in response to an operation upon the operation area for controlling the switcher, the second display mode changes a displayed image to an image supplied from another video transmission terminal connected to the switcher.

23. A communication system according to claim 21, wherein the image supplied from the arbitrary one during the second display mode is displayed in a size larger than the sizes of images supplied from the plurality of video transmission terminals during the first display mode.

24. A communication system according to claim 21, wherein the image supplied from the arbitrary one during the second display mode is displayed at a frame rate higher than the frame rates of images supplied from the plurality of video transmission terminals during the first display mode.

25. A communication system according to claim 21, wherein the image supplied from the arbitrary one during the second display mode is displayed at a resolution higher than the resolutions of images supplied from the plurality of video transmission terminals during the first display mode.

26. A communication system having a first display mode for displaying images received from a plurality of video transmission terminals on a monitor at the same time and a second display mode for displaying an image received from an arbitrary one of the plurality of video transmission terminals, wherein:

when the video transmission terminal transmitting an image displayed on the monitor is connected to a synthesizer, an image synthesis control instruction is allowed to be entered from an operation area on the monitor for controlling the synthesizer, irrespective of whether the mode is the first or second display mode.

27. A communication system according to claim 26, wherein the image synthesis control instruction is an instruction to synthesize a multi-image of images supplied from video transmission terminals connected to the synthesizer.

28. A communication system having a first display mode for displaying images received from a plurality of video transmission terminals on a monitor at the same time and a second display mode for displaying an image received from an arbitrary one of the plurality of video transmission terminals, wherein:

when the video transmission terminal transmitting an image displayed on the monitor is connected to a switcher, an image switch control instruction is allowed to be entered from an operation area on the monitor for controlling the switcher, irrespective of whether the mode is the first or second display mode.

29. A communication system according to claim 28, wherein the image switch control instruction is an instruction to switch an image to another image supplied from another video transmission terminal connected to the switch.

* * * * *